US008826324B2

(12) United States Patent
Kitazato

(10) Patent No.: US 8,826,324 B2
(45) Date of Patent: Sep. 2, 2014

(54) SERVER APPARATUS, TRICK REPRODUCTION RESTRICTION METHOD, AND RECEPTION APPARATUS

(75) Inventor: Naohisa Kitazato, Tokyo (JP)

(73) Assignee: Sony Corporation (JP)

( * ) Notice: Subject to any disclaimer, the term of this patent is extended or adjusted under 35 U.S.C. 154(b) by 343 days.

(21) Appl. No.: 12/798,600

(22) Filed: Apr. 7, 2010

(65) Prior Publication Data

US 2010/0275226 A1 Oct. 28, 2010

(30) Foreign Application Priority Data

Apr. 20, 2009 (JP) ................................ P2009-102113

(51) Int. Cl.
*H04N 7/025* (2006.01)
*H04N 7/173* (2011.01)

(52) U.S. Cl.
USPC .......................................................... 725/32

(58) Field of Classification Search
CPC .......... H04N 21/2347; H04N 21/2387; H04N 21/2541; H04N 21/6334; H04N 21/812; H04N 21/8355; H04N 21/8586
See application file for complete search history.

(56) References Cited

U.S. PATENT DOCUMENTS

| 7,870,023 | B2 * | 1/2011 | Ozer et al. ................... 705/14.4 |
| 2002/0138831 | A1 * | 9/2002 | Wachtfogel et al. ............ 725/32 |
| 2003/0192060 | A1 * | 10/2003 | Levy ............................. 725/133 |
| 2004/0003398 | A1 | 1/2004 | Donian et al. |
| 2007/0157237 | A1 * | 7/2007 | Cordray et al. .................. 725/42 |
| 2007/0178889 | A1 * | 8/2007 | Cortegiano et al. ........ 455/414.3 |
| 2007/0250888 | A1 | 10/2007 | Sato |
| 2010/0251278 | A1 * | 9/2010 | Agarwal et al. .................... 725/9 |
| 2011/0119700 | A1 * | 5/2011 | Hamilton ........................ 725/32 |

FOREIGN PATENT DOCUMENTS

| EP | 2034733 A2 | 3/2009 |
| JP | 2003061066 A | 2/2003 |
| JP | 2004-364001 A | 12/2004 |
| JP | 2008085936 A | 4/2008 |

OTHER PUBLICATIONS

Office Action from Japanese Application No. 2009-102113, dated Feb. 4, 2014.
European Search Report from EP Application No. 10159204, dated Feb. 19, 2014.

* cited by examiner

*Primary Examiner* — Rong Le
(74) *Attorney, Agent, or Firm* — Lerner, David, Littenberg, Krumholz & Mentlik, LLP

(57) ABSTRACT

A server apparatus used in a system that delivers, to a reception apparatus via a network, a commercial stream of a content prior to a delivery of a main-program stream of the content, the server apparatus including: a reproduction control information storage section to store reproduction control information for the commercial stream, that includes at least first setting information that sets whether to restrict a trick reproduction in the reception apparatus; and a reproduction control information transmission section to extract, in response to a first reproduction control information acquisition request from the reception apparatus, the reproduction control information for the commercial stream from the reproduction control information storage section and transmit the reproduction control information for the commercial stream to the reception apparatus.

10 Claims, 26 Drawing Sheets

FIG.2A CM-coupled stream delivery activation information
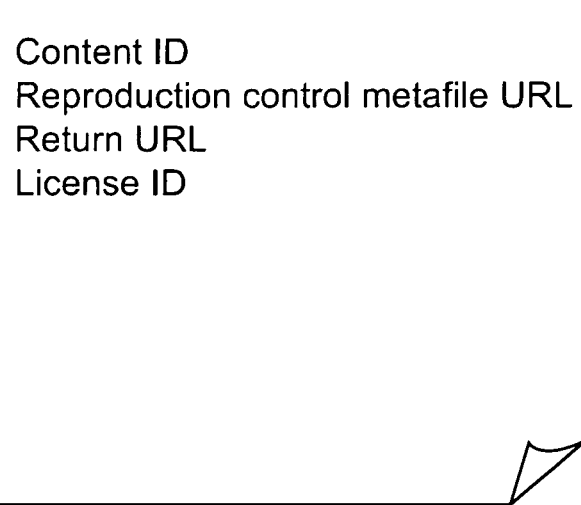
Content ID
Reproduction control metafile URL
Return URL
License ID
FIG.2B Main-program stream delivery activation information
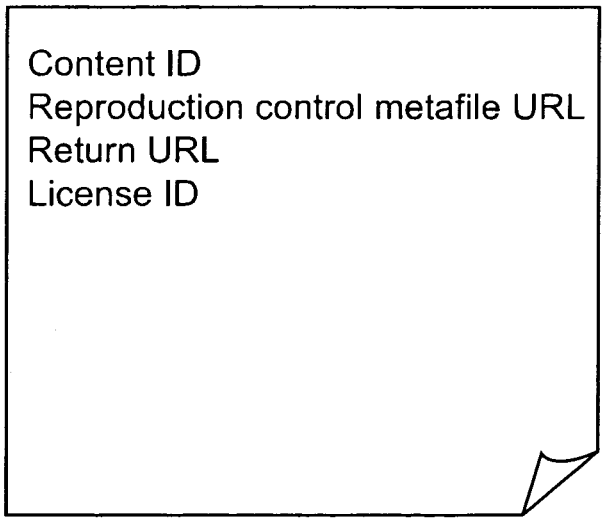
Content ID
Reproduction control metafile URL
Return URL
License ID ECG metadata

```
Content ID
Content title
Content Overview
Genre
Content time length
CM-coupled stream reproduction control metafile URL
Main-program stream reproduction control metafile URL
License ID for CM-coupled stream
License ID for main-program stream
```

Resume management table

| Content ID | User ID | End time position of CM-coupled stream | End time position of main-program stream |
|---|---|---|---|
| | | | | Resume information 1
| | | | | Resume information 2
| ... | ... | ... | ... |
| | | | | Resume information n ECG metadata

```
Content ID
Content title
Content Overview
Genre
Content time length
CM-coupled stream reproduction control metafile URL
Main-program stream reproduction control metafile URL
License ID for CM-coupled stream
License ID for main-program stream
Preference attribute-specific reproduction availability flag
```

FIG.22

SERVER APPARATUS, TRICK REPRODUCTION RESTRICTION METHOD, AND RECEPTION APPARATUS

CROSS-REFERENCE TO RELATED APPLICATION

The present application claims priority from Japanese Patent Application No. JP 2009-102113 filed in the Japanese Patent Office on Apr. 20, 2009, the entire content of which is incorporated herein by reference.

BACKGROUND OF THE INVENTION

1. Field of the Invention

The present invention relates to a server apparatus used in a system for delivering a commercial stream and a main-program stream of a content via a network, a trick reproduction restriction method, and a reception apparatus that receives and reproduces the streams.

2. Description of the Related Art

Along with prevalence of a high-speed data communication network, services of delivering streams of various contents such as a moving image and music using a VOD (Video On Demand) system are becoming popular. As a form of this type of service, a system of delivering a commercial stream (hereinafter, referred to as "CM stream") at least before delivering a stream of a main program (hereinafter, referred to as "main-program stream") of a content and letting a user view a CM is generally used.

As a method of realizing such a service, a method of integrating a CM stream and a main-program stream at a source level to manage them as a CM-attached content, and delivering a stream of the CM-attached content in response to a viewing request from the user is generally used.

By this method, however, since the main-program stream and the CM stream are coupled at the source level, the CM stream cannot be easily replaced with other streams. In other words, encode processing of an entire stream including the main-program stream and the CM stream of the content needs to be carried out every time the CM stream is replaced, which is inefficient.

There is known a system that uses a relay apparatus that relays, to a terminal of a viewer, a main-program stream and a CM stream respectively provided from a content server apparatus that provides main-program streams and a CM server apparatus that provides CM streams. In this system, the relay apparatus switches the streams to be delivered by the content server apparatus and the CM server apparatus in accordance with a preset commercial insertion schedule. As a result, a reorganization task of the CM-attached content at a source level becomes unnecessary, and a CM stream to be attached to the main-program stream can be replaced with ease (see, for example, Japanese Patent Application Laid-open No. 2004-364001).

SUMMARY OF THE INVENTION

By the method described above, however, since the relay apparatus assumes the switching of all commercials delivered to viewers, a large-scale relay system may become necessary particularly in view of responsiveness in a case where a delivery request occurs in a burst-like manner.

In view of the circumstances as described above, there is a need for a mechanism that is capable of replacing a CM stream to be attached to a main-program stream without using a relay system and without requiring a reorganization task of a CM-attached content at a source level.

In this regard, a mechanism that causes a reception apparatus of a viewer to sequentially access a main-program stream and a CM stream using individual URLs is being studied, the example of which is as follows.

A browser of a reception apparatus acquires, from a portal server connected thereto via a network, a web document such as an HTML document and a BML document that includes a list of CM-attached contents and delivery activation information necessary for activating a stream delivery of each CM-attached content. The browser displays the list of CM-attached contents included in the web document on a display screen and prompts a user to select a CM-attached content to view. The browser activates an AV player of the reception apparatus upon receiving an instruction to reproduce the selected CM-attached content.

The AV player acquires delivery activation information of the CM-attached content instructed to be reproduced from the portal server. Here, the delivery activation information of the CM-attached content includes a reproduction control metafile URL, a return URL, a license ID, a reproduction start time, and the like. The reproduction control metafile URL is a URL that specifies a location of a reproduction control metafile of a head stream constituting the CM-attached content. In this example, a stream of the CM-attached content is constituted of streams of n CMs (CM1, CM2, ..., CMn) and a stream of one main content program, and the main-program stream is reproduced after the n CM streams are reproduced successively. In this case, the reproduction control metafile URL in the delivery activation information that the reception apparatus acquires first for reproducing the CM-attached content is a URL that indicates a location of a reproduction control metafile for the head CM stream (CM1). Further, a return URL in the delivery activation information is a URL that indicates a location of a reproduction control metafile for a stream to be reproduced next, that is, the second CM stream (CM2) in this example.

After extracting the delivery activation information of the CM-attached content instructed to be reproduced, the AV player accesses a reproduction control meta-server based on the reproduction control metafile URL in the delivery activation information and acquires a reproduction control metafile for the CM stream instructed to be reproduced. In the reproduction control metafile, a content name, a content URL, a DRM server URL, a license ID, and the like are stored.

Next, the AV player extracts the DRM server URL and the license ID from the acquired reproduction control metafile. The AV player establishes a secure communication path with a DRM server based on the DRM server URL and transmits a license acquisition request including the extracted license ID to the DRM server. Accordingly, the AV player acquires a license including a content key corresponding to the license ID from the DRM server.

After acquiring the license, the AV player transmits a content acquisition request including a content URL of the CM stream extracted from the reproduction control metafile to the content server and receives an encrypted CM stream. The AV player decrypts the received encrypted CM stream using the content key included in the license, decodes encoded data obtained as a result of the decryption, and outputs video and audio. As a result, a reproduction of the CM stream is started. Upon ending the reproduction of the CM stream, the AV player transmits a reproduction end notification to the browser.

Upon receiving the reproduction end notification, the browser extracts a return URL from the delivery activation information of the CM-attached content, accesses the portal server based on the return URL, and acquires delivery activation information of the second CM stream (CM2).

Operations after that are the same as those carried out at the time of reproducing the first CM stream (CM1). When a reproduction of the second CM stream (CM2) is ended, processing with respect to the third CM stream (CM3) and a main-program stream is carried out similarly.

Since CM streams and main-program streams are provided independently in the system described above, a CM stream to be attached to a main-program stream can be replaced relatively easily. On the other hand, since an acquisition of a web document including delivery activation information, an acquisition of a reproduction control metafile, and an acquisition of a license are performed every time an individual CM stream and a main-program stream are received, a reproduction interruption may frequently occur between consecutive streams.

Moreover, in the reception apparatus, an intended advertising effect of a CM is difficult to be obtained when CMs are reproduced at high speed or reproduced skippingly by an operation made by a user of the reception apparatus. In this regard, a mechanism that inhibits the CMs from being reproduced at high speed or reproduced skippingly by an operation of the user of the reception apparatus may be necessary. Furthermore, if a CM distributor side can select whether to inhibit a reproduction at high speed or a skip reproduction for each CM, a CM delivery that uses a new system in which a CM that the CM distributor side wishes for the viewers to view for sure and a CM not necessarily so coexist becomes possible. Thus, a solving means for such a system may become necessary.

Moreover, in a typical content delivery system, even when a CM-attached content is viewed again after being interrupted in midst of a reproduction thereof, a reproduction of the CM-attached content is started from a head position. Therefore, it has been necessary for the user to perform an operation of forwarding a reproduction time position to a reproduction time position at which the reproduction has been previously interrupted by a reproduction at high speed, a skip reproduction, and the like.

In view of the circumstances as described above, there is a need for a server apparatus capable of securing an advertising effect of a commercial stream and improving a quality of a content delivery service, a trick reproduction restriction method, and a reception apparatus capable of using the content delivery service.

According to an embodiment of the present invention, there is provided a server apparatus used in a system that delivers, to a reception apparatus via a network, a commercial stream of a content prior to a delivery of a main-program stream of the content. The server apparatus includes a reproduction control information storage section and a reproduction control information transmission section. The reproduction control information storage section stores reproduction control information for the commercial stream, that includes at least first setting information that sets whether to restrict a trick reproduction in the reception apparatus. The reproduction control information transmission section extracts, in response to a first reproduction control information acquisition request from the reception apparatus, the reproduction control information for the commercial stream from the reproduction control information storage section and transmits the reproduction control information for the commercial stream to the reception apparatus.

In this embodiment, the reproduction control information for the commercial stream in the reception apparatus, that includes the first setting information that sets whether to restrict the trick reproduction such as a reproduction at high speed and a skip reproduction is transmitted to the reception apparatus. The reception apparatus is capable of acquiring and reproducing the commercial stream based on the reproduction control information including the first setting information and determining whether to permit the trick reproduction of the commercial stream based on the first setting information included in the reproduction control information. With this structure, it is possible to inhibit the trick reproduction of the commercial stream by an operation of a user to the reception apparatus and secure an advertising effect of the commercial stream. Moreover, since the setting can be made individually on whether to restrict the trick reproduction for each commercial stream, a commercial stream delivery that uses a new system in which a commercial stream that a distributor side wishes for the user to view for sure and a commercial stream not necessarily so coexist becomes possible.

The commercial stream may be a commercial-coupled stream structured by coupling a plurality of pieces of commercial data into one stream. With this structure, a reproduction is not interrupted at a time commercials are switched.

The server apparatus according to the embodiment of the present invention may further include a reproduction end notification reception section, a resume information storage section, and a reproduction resumption position notification section. The reproduction end notification reception section receives, from the reception apparatus, a reproduction end notification including at least first identification information that identifies the content interrupted while being reproduced in the reception apparatus, second identification information that identifies one of the reception apparatus and a user, and end time position information of one of the commercial stream and the main-program stream interrupted while being reproduced. The resume information storage section stores, as resume information, the first identification information, the second identification information, and the end time position information included in the received reproduction end notification in association with each other. The reproduction resumption position notification section transmits to the reception apparatus, as reproduction resumption position information, the end time position information of one of the commercial stream and the main-program stream of the content based on the resume information stored in the resume information storage section in response to a content-viewing request from the reception apparatus, that includes the first identification information that identifies the content interrupted while being reproduced and the second identification information that identifies one of the reception apparatus and the user.

In the server apparatus according to the embodiment of the present invention, the resume information storage section stores, as the resume information, the first identification information that identifies the content interrupted while being reproduced in the reception apparatus, the second identification information that identifies one of the reception apparatus and the user, and the end time position information of one of the commercial stream and the main-program stream in association with each other. The reproduction resumption position notification section of the server apparatus transmits to the reception apparatus, as the reproduction resumption position information, the end time position information of one of the commercial stream and the main-program stream of the content based on the resume information stored in the resume information storage section in response to the content-viewing request from the reception apparatus, that includes the first identification information that identifies the content interrupted while being reproduced and the second identification information that identifies one of the reception apparatus and the user. In the reception apparatus having such a structure, when a reproduction of a commercial stream or a main-program stream is interrupted by a user operation but the reproduction of that interrupted content is instructed again thereafter, the reproduction of the commercial stream or the main-program stream can be resumed from a time position at which the reproduction has been interrupted.

The server apparatus according to the embodiment of the present invention may further include a viewed-information recording section. The viewed-information recording section transmits, when the commercial stream is assumed to have been reproduced to the end based on the reproduction end notification of the commercial stream, delivery activation information for the main-program stream to the reception apparatus, and records commercial-viewed information that includes the first identification information and the second identification information included in the reproduction end notification.

With this structure, a viewing history of a commercial can be acquired for each user as information for analyzing a commercial effect.

The server apparatus according to the embodiment of the present invention may further include a user preference storage section and a delivery activation information transmission section. The user preference storage section stores information on a preference of a user of the reception apparatus. The delivery activation information transmission section selects the commercial stream satisfying the preference of the user by referencing the information on the preference of the user in the user preference storage section in response to a content-viewing request from the reception apparatus, and transmits, to the reception apparatus, delivery activation information including necessary information for acquiring the reproduction control information of the commercial stream in the reception apparatus.

Since the server apparatus according to the embodiment of the present invention can select and deliver a commercial stream satisfying a user preference to the reception apparatus, an advertising effect in the commercial delivery can be enhanced.

Further, in the server apparatus according to the embodiment of the present invention, the reproduction control information transmission section may select, in response to a second reproduction control information acquisition request including information on a preference of a user from the reception apparatus, the commercial stream satisfying the preference of the user, and transmit the reproduction control information of the commercial stream to the reception apparatus.

According to another embodiment of the present invention, there is provided a reception apparatus receiving, via a network, a commercial stream of a content prior to a delivery of a main-program stream of the content from the server apparatus according to the above embodiment and reproducing the commercial stream. The reception apparatus includes a first reproduction control information acquisition section and a stream reproduction section. The first reproduction control information acquisition section acquires the reproduction control information including the first setting information from the server apparatus. The stream reproduction section acquires and reproduces the commercial stream based on the acquired reproduction control information and determines, based on the first setting information included in the reproduction control information, whether to permit the trick reproduction of the commercial stream.

According to another embodiment of the present invention, there is provided a reception apparatus receiving, via a network, a commercial stream of a content prior to a delivery of a main-program stream of the content from the server apparatus according to the above embodiment and reproducing the commercial stream. The reception apparatus includes a reproduction end notification transmission section, a content-viewing request section, and a stream delivery request section. The reproduction end notification transmission section transmits, to the server apparatus, the reproduction end notification including at least the first identification information that identifies the content interrupted while being reproduced, the second identification information that identifies one of the reception apparatus and the user, and the end time position information of one of the commercial stream and the main-program stream interrupted while being reproduced. The content-viewing request section transmits to the server apparatus, when an instruction to view the content that has been interrupted while being reproduced is input by the user, the content-viewing request including the first identification information that identifies the content and the second identification information. The stream delivery request section acquires the reproduction resumption position information of one of the commercial stream and the main-program stream interrupted while being reproduced and requests the server apparatus to deliver one of the commercial stream and the main-program stream from a time position at which the reproduction has been interrupted based on the reproduction resumption position information, the reproduction resumption position information being transmitted from the server apparatus in response to the content-viewing request.

According to another embodiment of the present invention, there is provided a reception apparatus receiving, via a network, a commercial stream of a content prior to a delivery of a main-program stream of the content from the server apparatus according to the above embodiment and reproducing the commercial stream. The reception apparatus includes a user preference information provision section and a delivery activation information acquisition section. The user preference information provision section provides the information on the preference of the user to the server apparatus. The delivery activation information acquisition section transmits the content-viewing request to the server apparatus and acquires the delivery activation information including necessary information for acquiring the reproduction control information of the commercial stream satisfying the preference of the user from the server apparatus.

According to another embodiment of the present invention, there is provided a reception apparatus receiving, via a network, a commercial stream of a content prior to a delivery of a main-program stream of the content from the server apparatus according to the above embodiment and reproducing the commercial stream. The reception apparatus includes a second reproduction control information acquisition section. The second reproduction control information acquisition section transmits the second reproduction control information acquisition request including the information on the preference of the user to the server apparatus and acquires the reproduction control information of the commercial stream satisfying the preference of the user from the server apparatus.

According to another embodiment of the present invention, there is provided a method of restricting a trick reproduction of a commercial stream of a content delivered from a server apparatus to a reception apparatus prior to a delivery of a main-program stream of the content. The method includes: transmitting, from the server apparatus to the reception apparatus, reproduction control metadata necessary for controlling a reproduction of the commercial stream, the reproduction control metadata including first information that sets whether to restrict the trick reproduction; and acquiring and reproducing, by the reception apparatus, the commercial stream based on the reproduction control metadata and determining whether to permit the trick reproduction of the commercial stream based on the first information included in the reproduction control metadata.

As described above, according to the embodiments of the present invention, an advertising effect of a commercial stream can be secured and a quality of a content delivery service can be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 2 are diagrams respectively showing structures of CM-coupled stream delivery activation information and main-program stream delivery activation information according to the first embodiment;

FIG. 10 is a diagram showing a structure of ECG metadata of each content according to the second embodiment;

FIG. 15 is a diagram showing a structure of a resume management table according to Modified Example 1;

FIG. 22 is an explanatory diagram of ECG metadata of each content according to Modified Example 3;

DESCRIPTION OF PREFERRED EMBODIMENTS

Hereinafter, embodiments of the present invention will be described with reference to the drawings.

First Embodiment

Overall Structure of Content Delivery System

Figure 1:
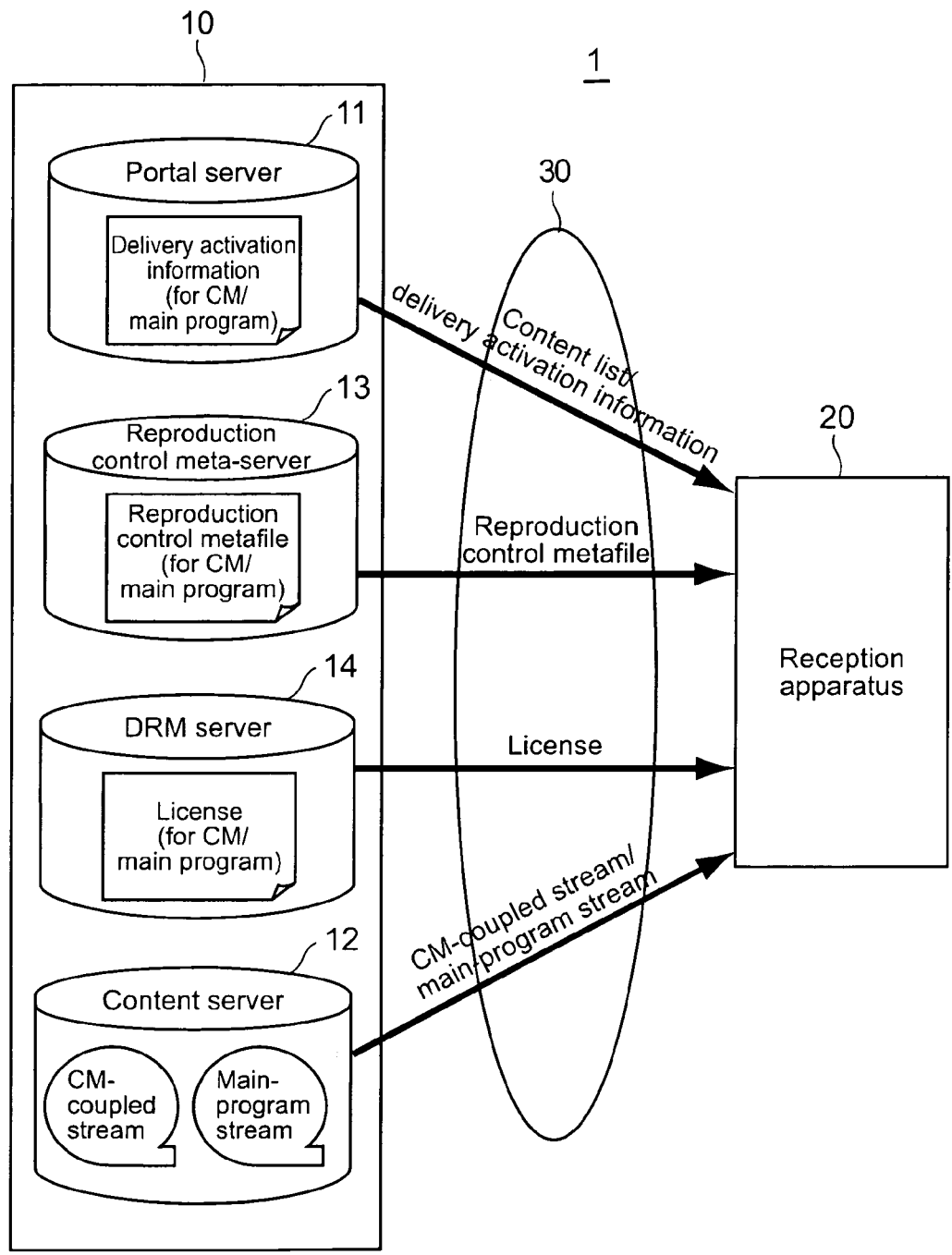
FIG. 1 is a block diagram showing an overall structure of a content delivery system according to a first embodiment of the present invention.

FIG. 1 is a block diagram showing an overall structure of a content delivery system according to a first embodiment of the present invention.

As shown in the figure, a content deliver system 1 is constituted of a server apparatus 10, a reception apparatus 20, a network 30 such as the Internet, and the like. The server apparatus 10 is constituted of a portal server 11, a content server 12, a reproduction control meta-server 13, and a DRM (Digital Rights Management) server 14.

In the portal server 11, a content list as a list of contents whose streams can be delivered by a VOD system and information for activating a delivery (hereinafter, referred to as "delivery activation information") of each stream listed in the content list are stored. Here, the contents are each a content to which commercials are attached (hereinafter, referred to as "CM-attached content"). The CM-attached content is constituted of a CM-coupled stream and a main-program stream, and individual delivery activation information is provided to each stream. The portal server 11 delivers to the reception apparatus 20 a web document including the content list in response to a content list acquisition request from the reception apparatus 20. The portal server 11 also transmits to the reception apparatus 20 a web document including delivery activation information of a content selected from the content list by a user of the reception apparatus 20 in response to a request from the reception apparatus 20. As a format of the web document, there are, for example, an HTML (Hypertext Markup Language) and a BML (Broadcast Markup Language).

FIG. 2 are diagrams showing structures of the delivery activation information. FIG. 2A shows CM-coupled stream delivery activation information, and FIG. 2B shows main-program stream delivery activation information. As shown in FIG. 2A, the CM-coupled stream delivery activation information includes a content ID, a reproduction control metafile URL, a return URL, a license ID, and the like of a CM-coupled stream. On the other hand, as shown in FIG. 2B, the main-program stream delivery activation information includes a content ID, a reproduction control metafile URL, a return URL, a license ID, and the like of a main-program stream. Here, the CM-coupled stream reproduction control metafile URL is a reference destination URL of a CM-coupled stream reproduction control metafile. The main-program stream reproduction control metafile URL is a reference destination URL of a main-program stream reproduction control metafile. The return URL of a CM-coupled stream is a reference destination URL of the main-program stream delivery activation information. The return URL of a main-program stream is a reference destination URL of a web document that notifies a viewer of a reproduction end of a CM-attached content.

Referring back to FIG. 1, in the content server 12, CM-coupled streams and main-program streams created for a VOD delivery are stored while being allocated with unique URLs. The content server 12 transmits a relevant stream to the reception apparatus 20 via the network 30 in response to a content acquisition request from the reception apparatus 20 addressed to the content URL.

In a storage section of the reproduction control meta-server 13 (corresponding to reproduction control information storage section), a CM-coupled stream reproduction control metafile and a main-program stream reproduction control metafile are stored while being allocated with unique URLs (reproduction control metafile URLs). The reproduction control meta-server 13 delivers a relevant reproduction control metafile to the reception apparatus 20 via the network 30 in response to a reproduction control metafile acquisition request from the reception apparatus 20 addressed to the reproduction control metafile URL (corresponding to reproduction control information transmission section).

Figure 3:
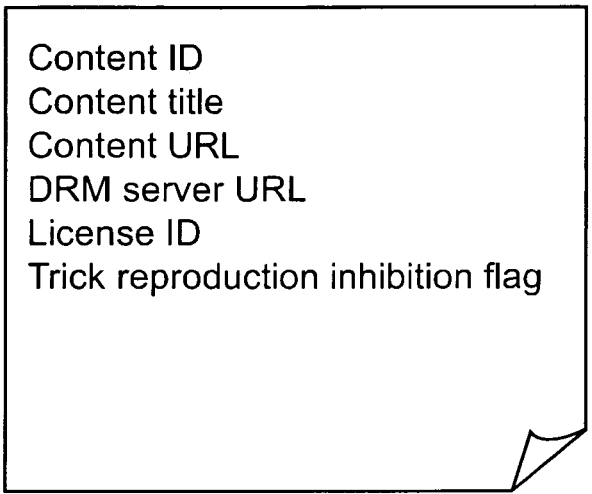
FIG. 3 is a diagram showing a structure of reproduction control metadata according to the first embodiment.

FIG. 3 is a diagram showing a structure of reproduction control metadata stored in a reproduction control metafile. As shown in the figure, in the reproduction control metafile, a content ID, a content title, a content URL, a DRM server URL, a license ID, a trick reproduction inhibition flag, and the like are stored as the reproduction control metadata. Here, the content URL is a URL that indicates an acquisition destination of a stream of a content. The DRM server URL is a URL that indicates an acquisition destination of a license necessary for viewing the content. The license ID is an ID for identifying a license. The trick reproduction inhibition flag (corresponding to first setting information) is a flag for setting whether to restrict a trick reproduction of a CM-coupled stream. Here, the trick reproduction is a reproduction mode such as a reproduction at high-speed and a skip reproduction, in which processing is carried out to end a stream reproduction in a shorter time than in a normal reproduction mode.

Referring back to FIG. 1, in the DRM server 14, a license including a content key for decrypting an encrypted stream delivered from the content server 12 and usage conditions thereof are stored. In response to a license acquisition request including a license ID from the reception apparatus 20, the DRM server 14 provides a license including a content key for decrypting an encrypted stream corresponding to the license ID and usage conditions thereof to the reception apparatus 20 via the network 30. The usage conditions include, for example, an expiration date of the content key. The reception apparatus 20 is capable of decrypting and reproducing the content within the expiration date using the content key.

The reception apparatus 20 uses the content list and the delivery activation information acquired from the portal server 11, the reproduction control metafile acquired from the reproduction control meta-server 13, and the license acquired from the DRM server 14 to receive and reproduce a CM-coupled stream and a main-program stream delivered from the content server 12. Next, a functional structure of the reception apparatus 20 will be described.

(Structure of Reception Apparatus 20)

Figure 4:
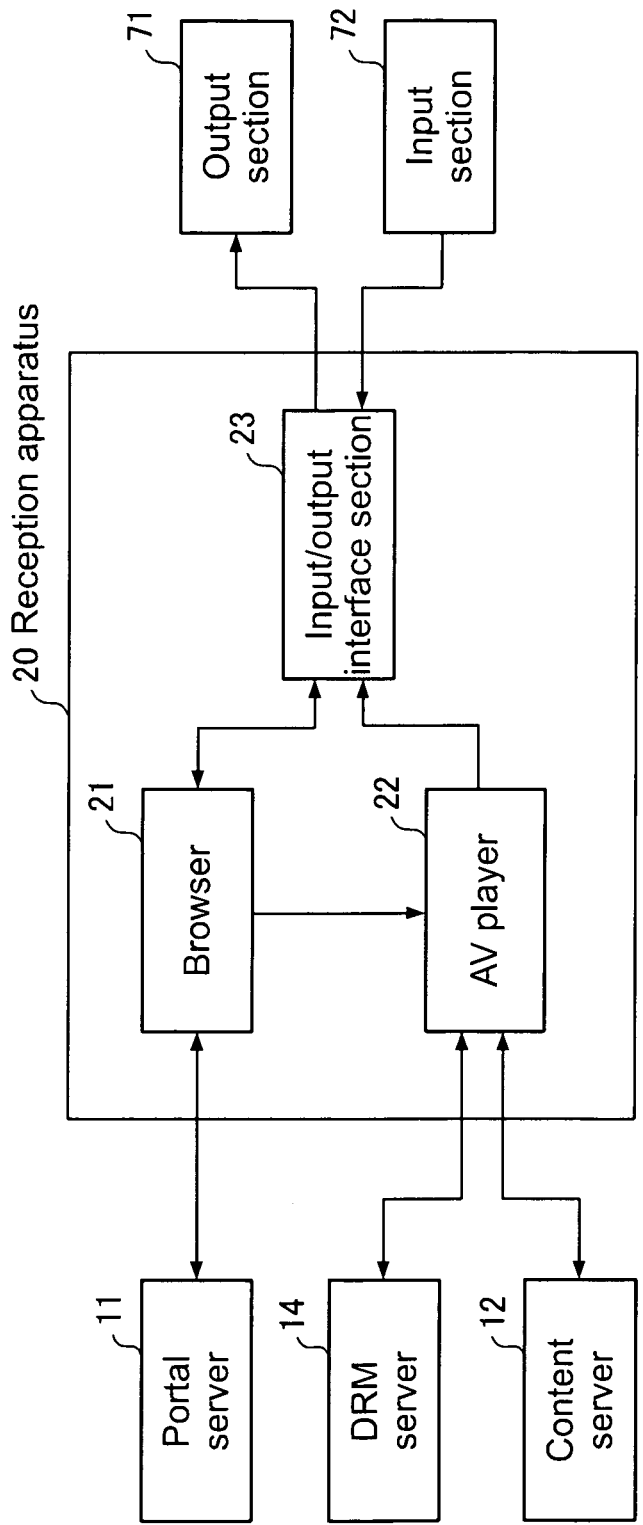
FIG. 4 is a block diagram showing a structure of a reception apparatus according to the first embodiment.

FIG. 4 is a block diagram showing a structure of the reception apparatus 20 according to the first embodiment of the present invention.

As shown in the figure, the reception apparatus 20 is constituted of a browser 21, an AV player 22, and an input/output interface section 23.

The browser 21 acquires a web document including a content list as a list of CM-attached contents from the portal server 11 and displays the content list on an output section 71 of the reception apparatus 20. The browser 21 transmits to the portal server 11 a viewing request of a CM-attached content selected by the user from the content list displayed on the output section 71 using an input section 72, and acquires CM-coupled stream delivery activation information of the CM-attached content as a response. The browser 21 outputs a content reproduction request including the CM-coupled stream delivery activation information to the AV player 22. It should be noted that the output section 71 is constituted of a display section that visually outputs information and an audio output section that outputs information as audio. The input section 72 is an apparatus with which information can be input by operating keys, buttons, a mouse, and the like.

When the content reproduction request is input from the browser 21, the AV player 22 acquires from the reproduction control meta-server 13, based on the CM-coupled stream delivery activation information included in the content reproduction request, a reproduction control metafile for the CM-coupled stream. The AV player 22 acquires a license including a content key for decrypting the encrypted CM-coupled stream from the DRM server 14 based on the reproduction control metadata stored in the acquired reproduction control metafile. The AV player 22 receives the CM-coupled stream from the content server 12 based on a content of the reproduction control metafile and decrypts the CM-coupled stream with the content key included in the license. The AV player 22 performs a decode to restore AV data from the decrypted stream data and outputs the decoded AV data to the output section 71 via the input/output interface section 23.

The input/output interface section 23 outputs the AV data input from the AV player 22 to the output section 71 externally connected to the reception apparatus 20.

(Regarding CM-Attached Content)

Next, a CM-attached content will be described.

Figure 5:
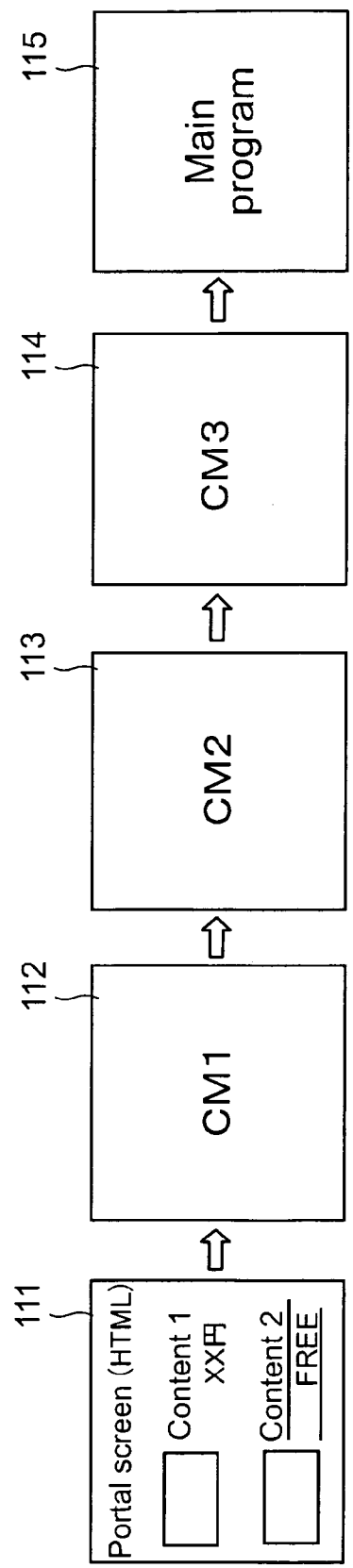
FIG. 5 is a diagram showing an example of a temporal transition from a portal screen to a CM-attached content reproduction screen according to the first embodiment.

FIG. 5 is a diagram showing an example of a temporal transition from a portal screen to a CM-attached content reproduction screen. When a CM-attached content that the user wishes to view is selected by the user on a portal screen 111 and a reproduction instruction is input, a plurality of CM streams (CM1, CM2, . . . , CMn) 112 to 114 coupled to one another to constitute one CM-coupled stream are first reproduced sequentially. After a reproduction of the last CM stream (CMn) 114 is ended, a main-program stream 115 is reproduced. As described above, the CM-attached content is constituted of one CM-coupled stream obtained by coupling n CM streams and a main-program stream that is reproduced subsequent to the CM-coupled stream. The CM-coupled stream and the main-program stream are managed individually in the content server 12 and delivered individually in response to stream delivery requests. Therefore, a CM-coupled stream to be attached to a main-program stream can be changed easily. The CM-coupled stream to be attached to the main-program stream is changed by changing the return URL included in the CM-coupled stream delivery activation information, for example.

(Method of Creating CM-Coupled Stream)

Next, a method of creating one CM-coupled stream by coupling a plurality of CM streams will be described.

Figure 6:
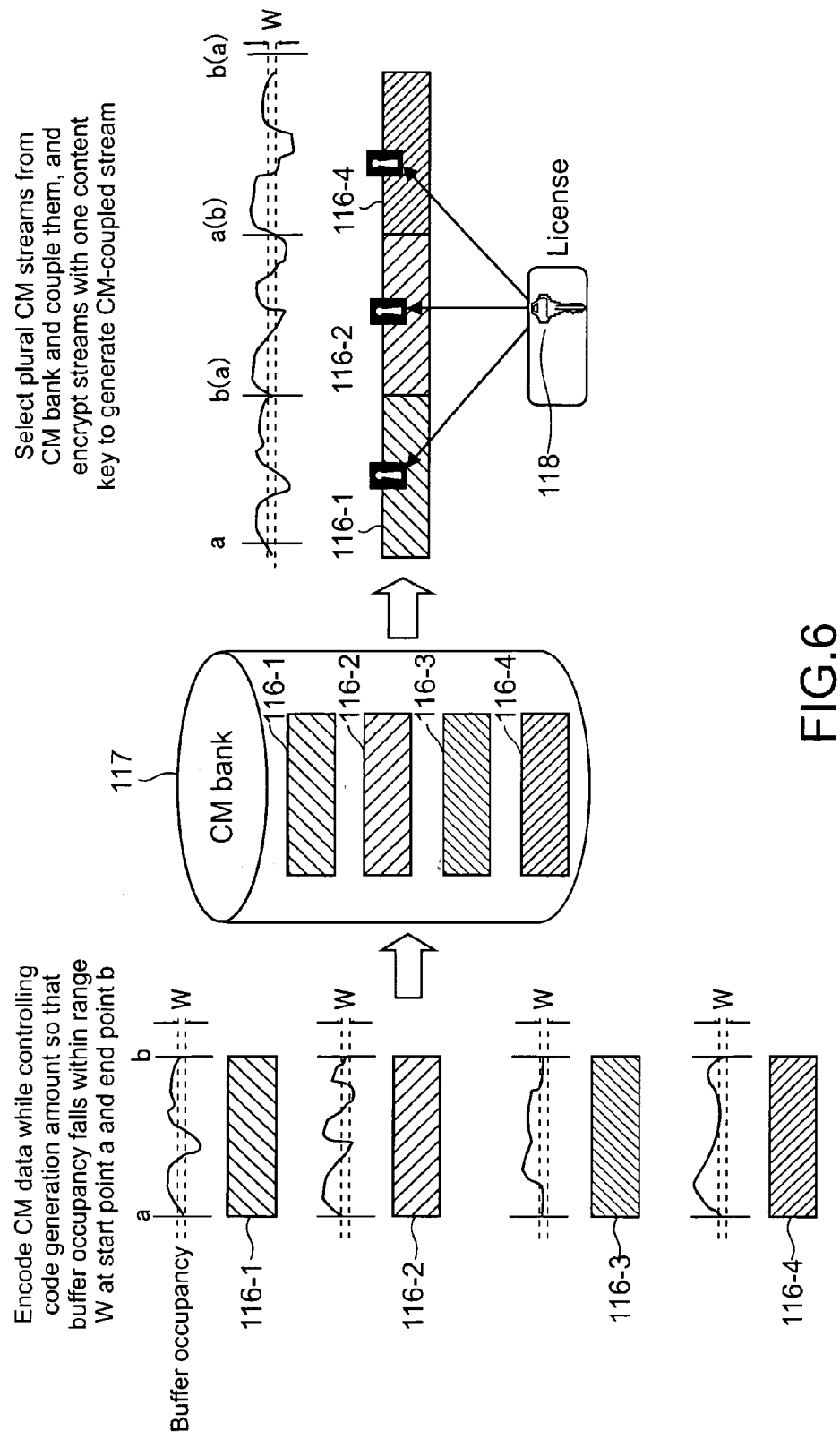
FIG. 6 is a schematic diagram showing a generation of a CM-coupled stream according to the first embodiment.

FIG. 6 is a schematic diagram showing a generation of a CM-coupled stream.

First, by compression-coding original CM data by a predetermined method, CM streams 116-1 to 116-4 are obtained. At this time, a code generation amount is controlled by varying an encoding condition of a quantization parameter and the like so that a buffer occupancy in an encoder at a start point a and an end point b of the CM streams 116-1 to 116-4 falls within a setting range W. The CM streams 116-1 to 116-4 compression-coded as described above are stored in a storage section 117 called CM bank. Next, a plurality of CM streams (e.g., 116-1, 116-2, and 116-4) for constituting a CM-coupled stream are selectively extracted from the storage section 117 and coupled to one another so that an unencrypted CM-coupled stream is obtained. Next, the CM-coupled stream is encrypted with one content key 118 to become a CM-coupled stream for a delivery.

By this method of creating a CM-coupled stream, CM-coupled streams in which a plurality of CM streams are combined in various patterns can be created easily. Accordingly, a reorganization of a CM-coupled stream involving, for example, replacing a partial CM stream in an existing CM-coupled stream with a different CM stream can be carried out with ease. Moreover, by this method of creating a CM-coupled stream, a buffer overflow in which a buffer occupancy inside a decoder of the reception apparatus 20 becomes excessively large or a buffer underflow in which the buffer occupancy becomes excessively small can be prevented from occurring at a time CM streams reproduced by the reception apparatus 20 are switched, and a CM-coupled stream that can be reproduced favorably can be obtained.

(Operation From Selection to Reproduction of CM-Attached Content)

Next, an operation from a selection to a reproduction of a CM-attached content in the reception apparatus 20 in the content deliver system 1 of the first embodiment will be described.

Figure 7:
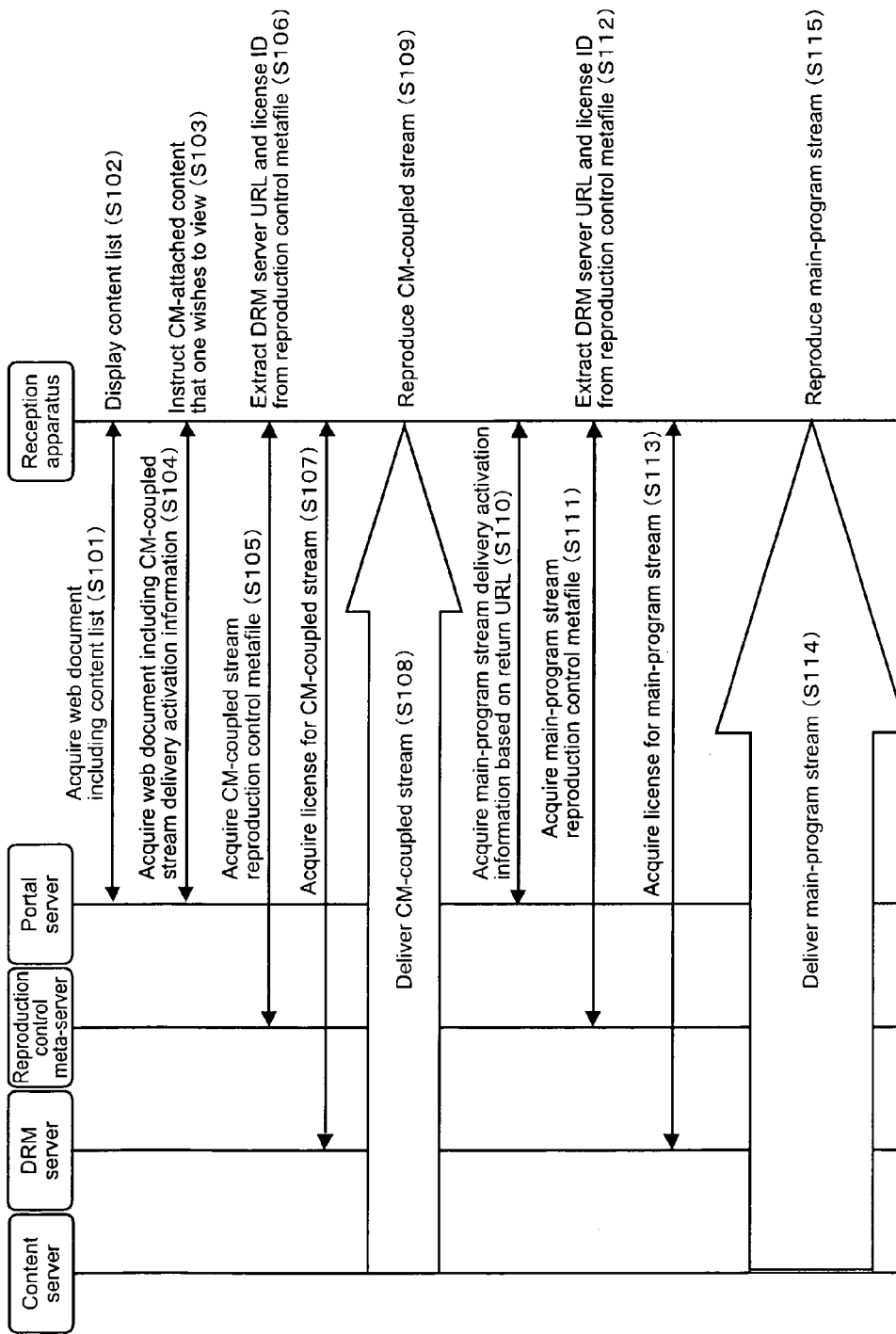
FIG. 7 is a sequence diagram showing processes from a selection to a reproduction of a CM-attached content according to the first embodiment.
Figure 8:
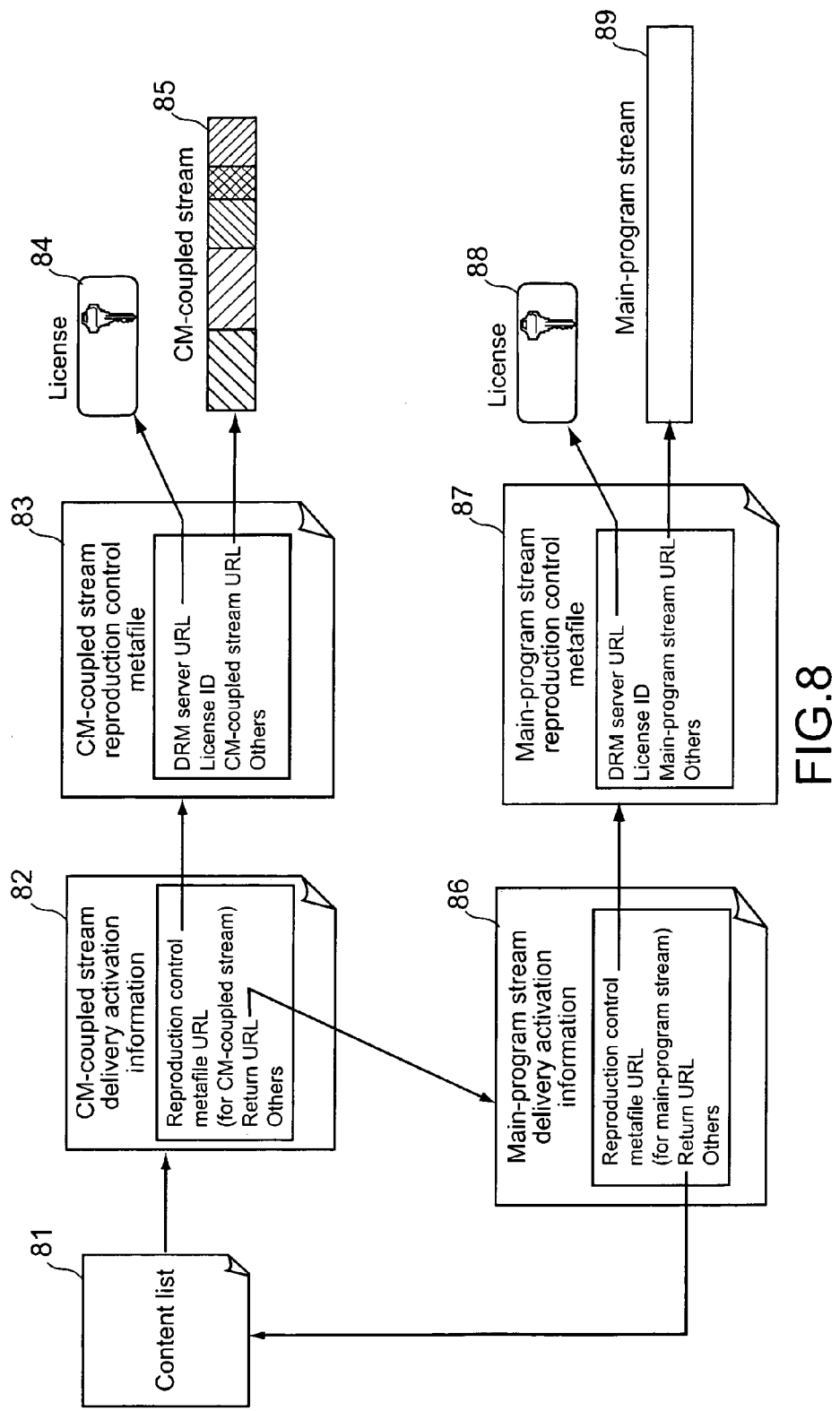
FIG. 8 is a diagram showing a relationship among delivery activation information, reproduction control metafiles, licenses, a CM-coupled stream, and a main-program stream according to the first embodiment.

FIG. 7 is a sequence diagram showing processes from a selection to a reproduction of a CM-attached content in the content deliver system 1 of the first embodiment. FIG. 8 is a diagram showing a relationship among delivery activation information, reproduction control metafiles, licenses, a CM-coupled stream, and a main-program stream.

First, the browser 21 of the reception apparatus 20 is activated. The browser 21 transmits a content list acquisition request to the portal server 11 via the network 30. Upon receiving the content list acquisition request, the portal server 11 creates a web document including a content list 81 and transmits it to the browser 21 of the reception apparatus 20.

Upon receiving the web document including the content list 81 from the portal server 11 (S101), the browser 21 of the reception apparatus 20 displays the content list 81 on the output section 71 (S102). The user selects a CM-attached content that the user wishes to view (reproduce) from the displayed content list 81 using the input section 72 and inputs a reproduction instruction (S103). The browser 21 receives the user input as a viewing request of the CM-attached content and transmits a content viewing request including a content ID of the CM-attached content to the portal server 11.

In a storage section of the portal server 11, a content ID of a CM-attached content and CM-coupled stream delivery activation information 82 are stored in association with each other. Upon receiving the content viewing request, the portal server 11 extracts the CM-coupled stream delivery activation information 82 associated with the content ID of the CM-attached content included in the content viewing request from the storage section thereof. Then, the portal server 11 creates a web document including the CM-coupled stream delivery activation information 82 and transmits it to the browser 21 of the reception apparatus 20.

Upon receiving the web document including the CM-coupled stream delivery activation information 82 from the portal server 11 (S104), the browser 21 outputs an activation request including the CM-coupled stream delivery activation information 82 to the AV player 22. Upon receiving the activation request from the browser 21, the AV player 22 extracts a CM-coupled stream reproduction control metafile URL from the CM-coupled stream delivery activation information 82 included in the activation request. By transmitting a reproduction control metafile acquisition request to the reproduction control meta-server 13 based on the CM-coupled stream reproduction control metafile URL, the AV player 22 acquires a CM-coupled stream reproduction control metafile 83 from the reproduction control meta-server 13 (S105).

Next, the AV player 22 extracts a DRM server URL and a license ID from the acquired CM-coupled stream reproduction control metafile 83 (S106). Based on the DRM server URL, the AV player 22 establishes a secure communication path with the DRM server 14 and transmits a license acquisition request including the license ID to the DRM server 14 via the secure communication path. Accordingly, the AV player 22 acquires a license 84 including a content key corresponding to the license ID from the DRM server 14 (S107). After that, the AV player 22 extracts a content URL of the CM-coupled stream from the CM-coupled stream reproduction control metafile 83 and transmits a content acquisition request to the content server based on the content URL. Upon receiving the content acquisition request, the content server 12 delivers a relevant CM-coupled stream 85 to the AV player 22 of the reception apparatus 20 (S108).

Since the CM-coupled stream 85 received by the reception apparatus 20 is subjected to an encryption and compression coding, the AV player 22 decodes the CM-coupled stream 85 after decrypting it using the content key included in the license 84 and outputs video data and audio data to the output section 71 via the input/output interface section 23. Accordingly, a reproduction of the CM-coupled stream 85 is started (S109).

Upon ending the reproduction of the CM-coupled stream 85, the AV player 22 notifies the browser 21 to that effect. Upon being notified, the browser 21 extracts a return URL from the CM-coupled stream delivery activation information 82. The return URL indicates a reference destination of main-program stream delivery activation information 86 as described above. The browser 21 accesses the portal server 11 based on the return URL and acquires a web document including the main-program stream delivery activation information 86 (S110).

The browser 21 outputs an activation request including the main-program stream delivery activation information 86 included in the acquired web document to the AV player 22. Upon receiving the activation request from the browser 21, the AV player 22 extracts a main-program stream reproduction control metafile URL from the main-program stream delivery activation information 86 included in the activation request. By transmitting a reproduction control metafile acquisition request to the reproduction control meta-server 13 based on the main-program stream reproduction control metafile URL, the AV player 22 acquires a reproduction control metafile for the main-program stream from the reproduction control meta-server 13 (S111).

Next, the AV player 22 extracts a DRM server URL and a license ID from the acquired main-program stream reproduction control metafile 87 (S112). Based on the DRM server URL, the AV player 22 establishes a secure communication path with the DRM server 14 and transmits a license acquisition request including the license ID to the DRM server 14 via the secure communication path. Accordingly, the AV player 22 acquires a license 88 including a content key corresponding to the license ID from the DRM server 14 (S113). After that, the AV player 22 extracts a content URL of the main-program stream from the main-program stream reproduction control metafile 87 and transmits a content acquisition request to the content server 12 based on the content URL. Upon receiving the content acquisition request, the content server 12 delivers a relevant main-program stream 89 to the AV player 22 of the reception apparatus 20 (S114).

Since the main-program stream 89 received by the reception apparatus 20 is subjected to an encryption and compression coding, the AV player 22 decodes the main-program stream 89 after decrypting it using the content key included in the license 88 and outputs video data and audio data to the output section 71 via the input/output interface section 23. Accordingly, a reproduction of the main-program stream 89 is started (S115).

Upon ending the reproduction of the main-program stream 89 in the reception apparatus 20, the AV player 22 notifies the browser 21 to that effect. Based on the return URL included in the main-program stream delivery activation information 86 acquired from the portal server 11, the browser 21 acquires information on a webpage to be displayed after the reproduction of the main-program stream 89 is ended and displays the webpage on the output section 71. In FIG. 8, the webpage to be displayed after the reproduction of the main-program stream 89 is ended is a page of the content list that the portal server 11 provides, for example.

As described above, according to the first embodiment, the delivery activation information, the reproduction control metafile, the license, and the like only need to be acquired once for acquiring and reproducing a CM-coupled stream. Accordingly, a CM-coupled stream can be reproduced smoothly without being interrupted at a time CMs are switched.

Second Embodiment

Next, the content deliver system 1 in a case where the same operation is carried out using ECG metadata will be described.

Figure 9:
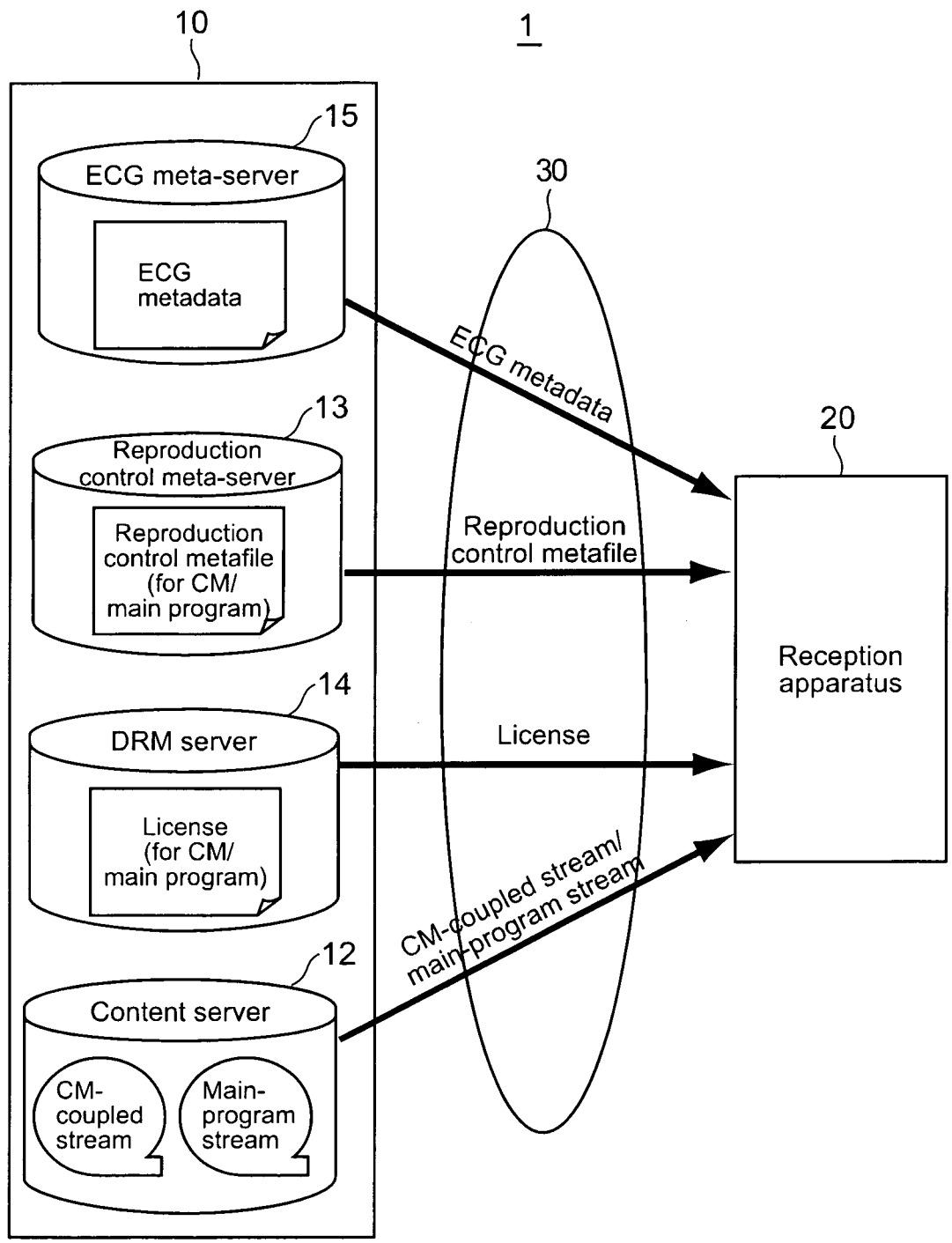
FIG. 9 is a block diagram showing an overall structure of the content delivery system according to a second embodiment of the present invention.

FIG. 9 is a block diagram showing an overall structure of the content delivery system according to a second embodiment of the present invention. As shown in the figure, in the content deliver system 1, the server apparatus 10 is constituted of an ECG meta-server 15, the content server 12, the reproduction control meta-server 13, and the DRM server 14.

The ECG meta-server 15 is a server that delivers ECG metadata of each CM-attached content whose stream can be delivered by the VOD system.

FIG. 10 is a diagram showing a structure of ECG metadata of each content.

As shown in the figure, the ECG metadata includes a content ID, a content title, a content overview, a genre, and a content time length of a CM-attached content, a CM-coupled stream reproduction control metafile URL, a main-program stream reproduction control metafile URL, a license ID for a CM-coupled stream, a license ID for a main-program stream, and the like.

(Structure of Reception Apparatus 20 of Second Embodiment)

Figure 11:
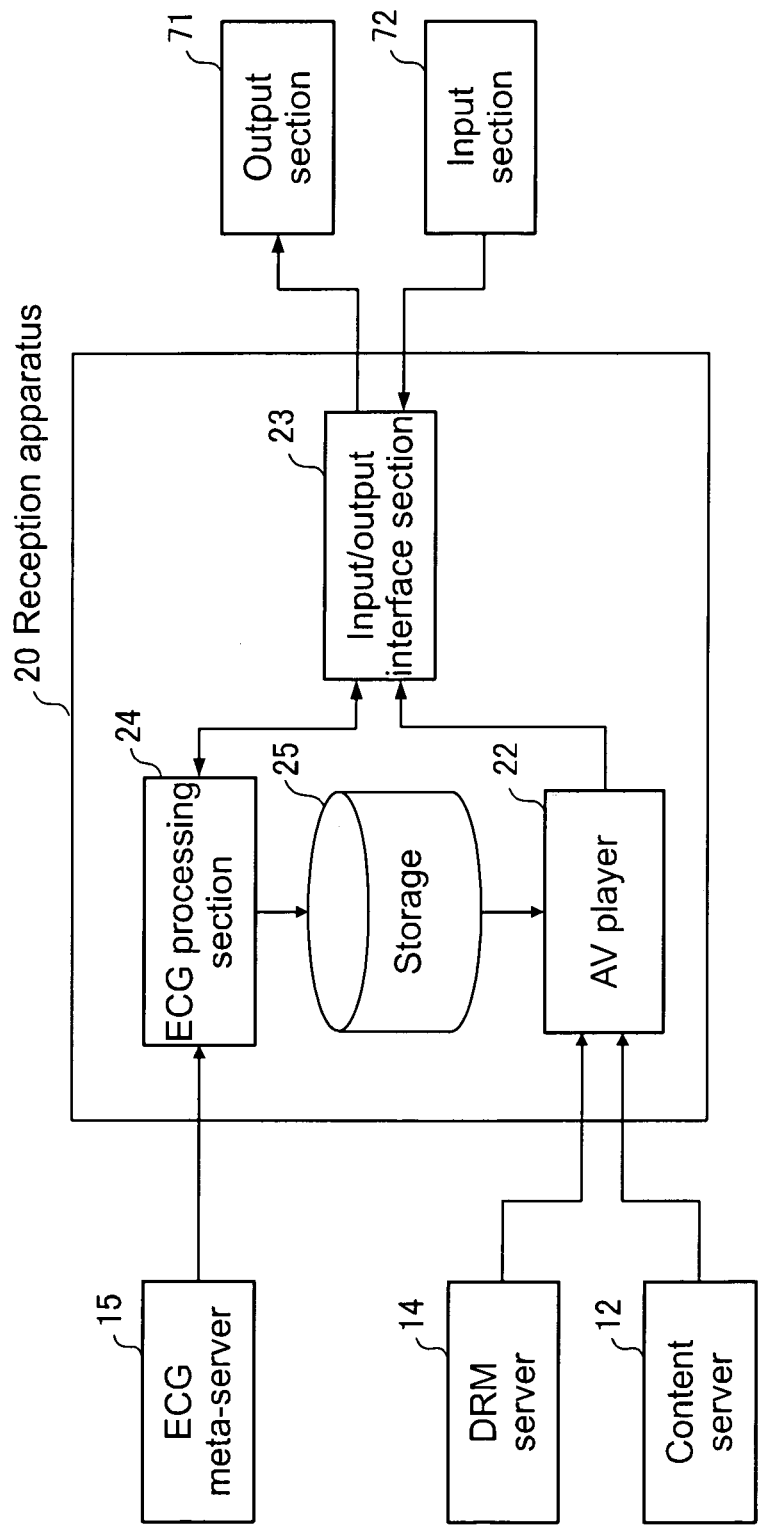
FIG. 11 is a block diagram showing a structure of a reception apparatus according to the second embodiment.

FIG. 11 is a block diagram showing a structure of the reception apparatus 20 according to the second embodiment of the present invention.

As shown in the figure, the reception apparatus 20 is constituted of an ECG processing section 24, a storage 25, the AV player 22, and the input/output interface section 23.

The ECG processing section 24 acquires ECG metadata from the ECG meta-server 15 and stores it in the storage 25. In response to an instruction from a user, the ECG processing section 24 creates a content navigation screen based on the ECG metadata stored in the storage 25 and displays it on the output section 71 via the input/output interface section 23. The ECG processing section 24 extracts, from the ECG metadata stored in the storage 25, a CM-coupled stream reproduction control metafile URL of a content selected by the user on the displayed content navigation screen using the input section 72. Then, the ECG processing section 24 outputs an activation request including the CM-coupled stream reproduction control metafile URL to the AV player 22.

The storage 25 is a storage section constituted of a hard disk drive and the like that stores ECG metadata acquired by the ECG processing section 24.

When input with the activation request from the ECG processing section 24, the AV player 22 transmits, based on the CM-coupled stream reproduction control metafile URL included in the activation request, a reproduction control metafile acquisition request for the CM-coupled stream to the reproduction control meta-server 13. Other operations of the AV player 22 are the same as those of the first embodiment.

(Operation From Selection to Reproduction of CM-Attached Content According to Second Embodiment)

Next, an operation from a selection to a reproduction of a CM-attached content in the reception apparatus 20 in the content deliver system 1 of the second embodiment will be described.

Figure 12:
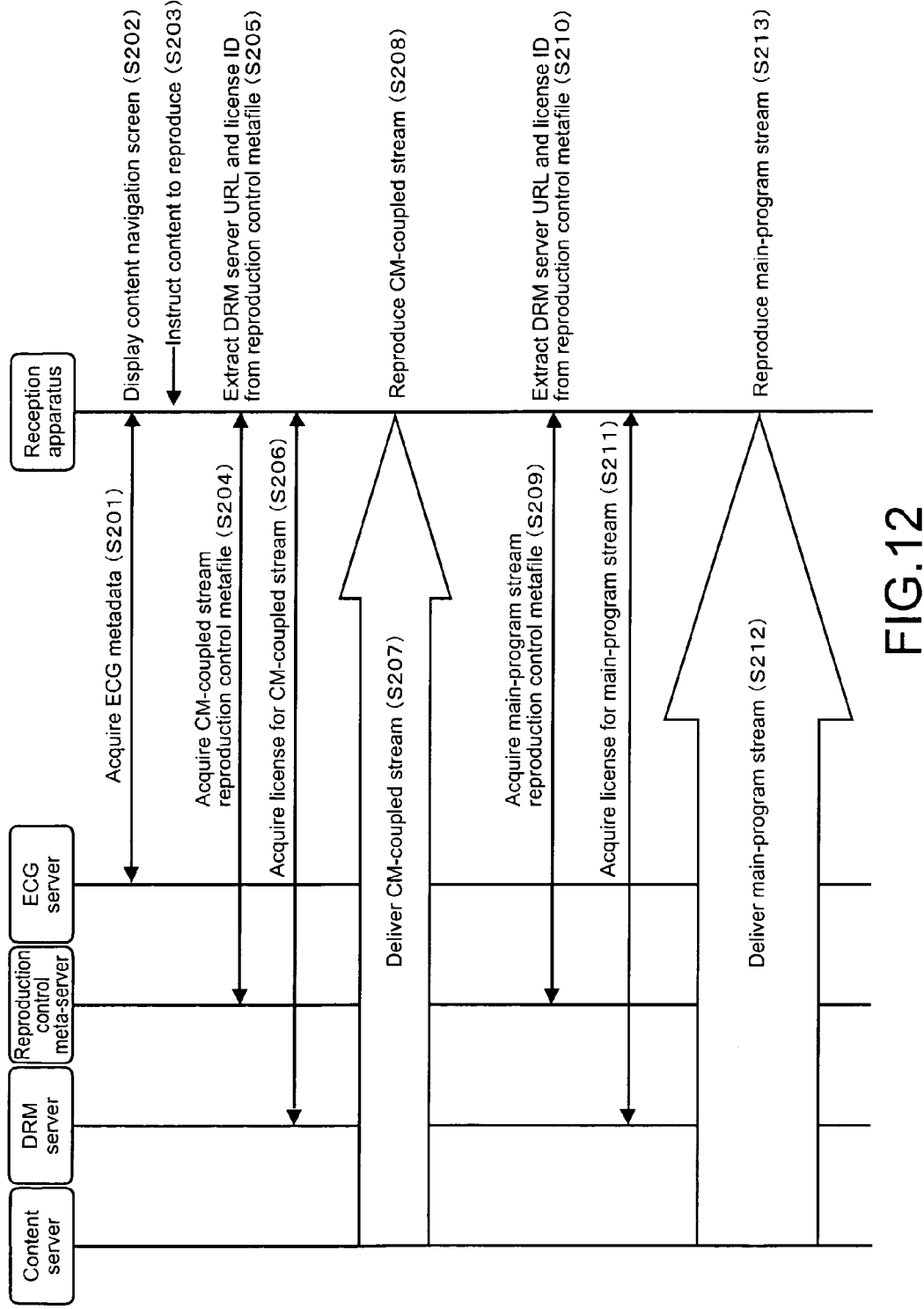
FIG. 12 is a sequence diagram showing processes from a selection to a reproduction of a CM-attached content based on ECG metadata according to the second embodiment.
Figure 13:
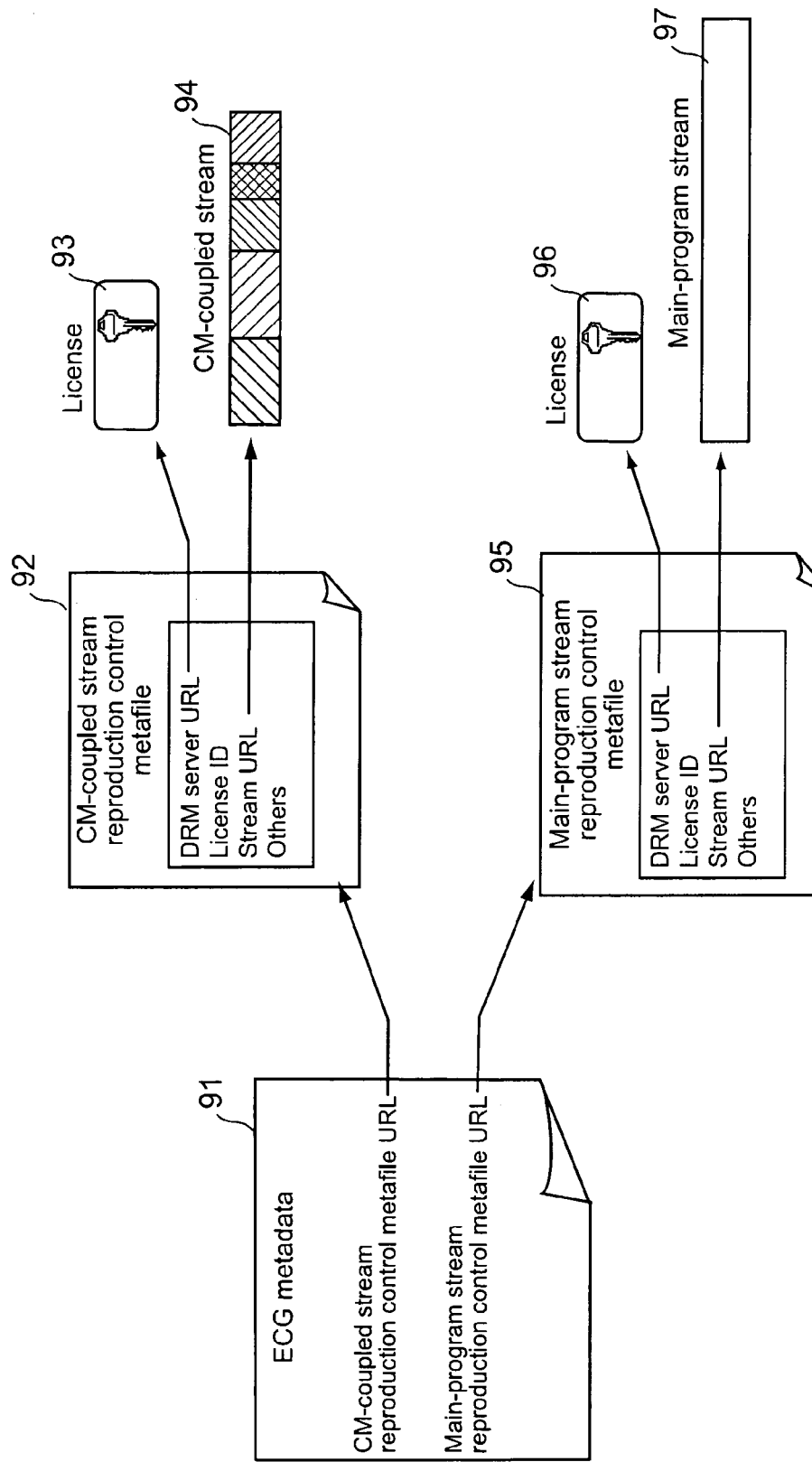
FIG. 13 is a diagram showing a relationship among ECG metadata, reproduction control metafiles, licenses, a CM-coupled stream, and a main-program stream according to the second embodiment.

FIG. 12 is a sequence diagram showing processes from a selection to a reproduction of a CM-attached content based on ECG metadata in the content deliver system of the second embodiment. FIG. 13 is a diagram showing a relationship among ECG metadata, reproduction control metafiles, licenses, a CM-coupled stream, and a main-program stream.

The ECG processing section 24 of the reception apparatus 20 acquires latest ECG metadata 91 from the ECG meta-server 15 and stores it in the storage 25 (S201). More specifically, the ECG processing section 24 periodically accesses the ECG meta-server 15 or accesses the ECG meta-server 15 every time it is activated, for example, to acquire the latest ECG metadata.

In the reception apparatus 20, a content navigation screen display request is input to the ECG processing section 24 via the input/output interface section 23 by the user using the input section 72. Upon receiving the display request, the ECG processing section 24 creates a content navigation screen based on the ECG metadata 91 stored in the storage 25 and displays it on the output section 71 (S202). The content navigation screen is a screen that displays thereon a title, an overview, a genre, a time length, and the like of viewable CM-attached contents and prompts the user to select a content.

When a CM-attached content that the user wishes to view is selected by the user on the content navigation screen using the input section 72 (S203), the ECG processing section 24 extracts a CM-coupled stream reproduction control metafile URL of that CM-attached content from the ECG metadata 91 stored in the storage 25. The ECG processing section 24 outputs an activation request including the CM-coupled stream reproduction control metafile URL to the AV player 22. Upon receiving the activation request, the AV player 22 transmits a reproduction control metafile acquisition request to the reproduction control meta-server 13 based on the CM-coupled stream reproduction control metafile URL included in the activation request, to thus acquire a reproduction control metafile 92 for the CM-coupled stream from the reproduction control meta-server 13 (S204).

Next, the AV player 22 extracts a DRM server URL and a license ID from the acquired CM-coupled stream reproduction control metafile 92 (S205). Based on the extracted DRM server URL, the AV player 22 establishes a secure communication path with the DRM server 14 and transmits a license acquisition request including the license ID to the DRM server 14 via the secure communication path. Accordingly, the AV player 22 acquires a license 93 corresponding to the license ID from the DRM server 14 (S206). After that, the AV player 22 extracts a content URL of the CM-coupled stream from the CM-coupled stream reproduction control metafile 92 and transmits a content acquisition request to the content server 12 based on the content URL. Upon receiving the content acquisition request, the content server 12 delivers a relevant CM-coupled stream 94 to the AV player 22 of the reception apparatus 20 (S207).

Since the CM-coupled stream 94 received by the reception apparatus 20 is subjected to an encryption and compression coding, the AV player 22 decodes the CM-coupled stream 94 after decrypting it using the content key included in the license 93 and outputs video data and audio data to the output section 71 via the input/output interface section 23. Accordingly, a reproduction of the CM-coupled stream 94 is started (S208).

Upon ending the reproduction of the CM-coupled stream 94, the AV player 22 notifies the ECG processing section 24 to that effect. Upon being notified, the ECG processing section 24 extracts a main-program stream reproduction control metafile URL from the ECG metadata 91 stored in the storage 25 and outputs an activation request including the main-program stream reproduction control metafile URL to the AV player 22. Upon receiving the activation request, the AV player 22 transmits a reproduction control metafile acquisition request to the reproduction control meta-server 13 based on the main-program stream reproduction control metafile URL included in the activation request, to thus acquire a reproduction control metafile 95 for the main-program stream from the reproduction control meta-server 13 (S209).

Next, the AV player 22 extracts a DRM server URL and a license ID from the acquired main-program stream reproduction control metafile 95 (S210). Based on the DRM server URL, the AV player 22 establishes a secure communication path with the DRM server 14 and transmits a license acquisition request including the license ID to the DRM server 14 via the secure communication path. Accordingly, the AV player 22 acquires a license 96 corresponding to the license ID from the DRM server 14 (S211). After that, the AV player 22 extracts a content URL of the main-program stream from the main-program stream reproduction control metafile 95 and transmits a content acquisition request to the content server 12 based on the content URL of the main-program stream. Upon receiving the content acquisition request, the content server 12 delivers a relevant main-program stream 97 to the AV player 22 of the reception apparatus 20 (S212).

Since the main-program stream 97 received by the reception apparatus 20 is subjected to an encryption and compression coding, the AV player 22 decodes the main-program stream 97 after decrypting it using the content key included in the license 96 and outputs video data and audio data to the output section 71 via the input/output interface section 23. Accordingly, a reproduction of the main-program stream 97 is started (S213).

As described above, according to the second embodiment, also when the reception apparatus 20 receives and reproduces a CM-attached content using ECG metadata, the CM-coupled stream can be reproduced smoothly without being interrupted at a time CMs are switched.

(Invalidation of Trick Reproduction Operation)

Next, a mechanism of restricting a trick reproduction such as a reproduction at high speed and a skip reproduction during a reproduction of a CM-coupled stream in the reception apparatus 20 according to the first and second embodiments will be described. More specifically, a restriction of a trick reproduction in the reception apparatus involves an inhibition of a trick reproduction, that is, invalidation of a trick reproduction operation by a user.

As shown in FIG. 3, reproduction control metadata for a CM-coupled stream includes a trick reproduction inhibition flag that sets whether to restrict a trick reproduction. When a trick reproduction inhibition flag in an acquired CM-coupled stream reproduction control metafile is set to be on, the AV player 22 of the reception apparatus 20 does not accept a trick reproduction command from the user during a reproduction of the CM-coupled stream (corresponding to first reproduction control information acquisition section and stream reproduction section). As a result, an advertising effect of a CM-coupled stream can be secured.

Moreover, by introducing the trick reproduction inhibition flag into the reproduction control metadata, whether to permit the trick reproduction for each CM-coupled stream can be selected on a content provider side. As a result, a CM delivery that uses a new system in which a CM-coupled stream that the content provider side wishes for the user to view for sure and a CM-coupled stream that is not necessarily so coexist becomes possible.

It should be noted that means for restricting a trick reproduction according to the embodiment of the present invention is applicable to not only a case of delivering a CM-coupled stream but also a case of delivering a single CM stream.

Modified Example 1

Next, a resume function of a stream reproduction will be described as Modified Example 1 of the above embodiments.

Figure 14:
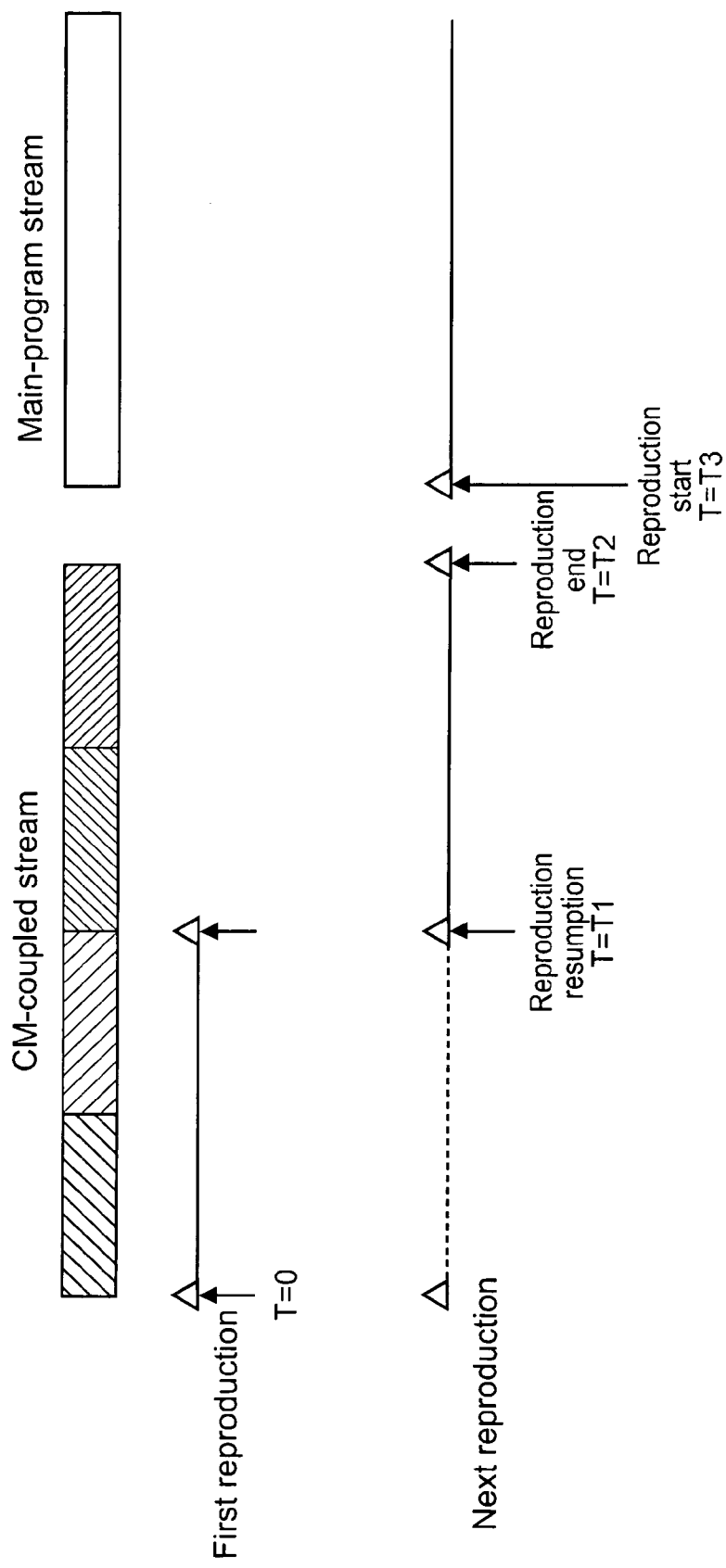
FIG. 14 is a schematic diagram of a resume function of a stream reproduction according to Modified Example 1 of the embodiments.

FIG. 14 is a schematic diagram of a resume function of a stream reproduction.

The resume function is a function of resuming, when a reproduction of a CM-attached content is interrupted by an instruction of the user, but a reproduction of the same CM-attached content is instructed by the user again after that, the reproduction of that CM-attached content from a time position at which the reproduction has been interrupted.

For realizing the resume function of a stream reproduction, the portal server 11 includes a resume management table (corresponding to resume information storage section).

FIG. 15 is a diagram showing a structure of the resume management table. To the resume management table, a plurality of pieces of resume information can be recorded. The individual resume information is constituted of a user ID, a content ID of a CM-attached content, an end time position of a CM-coupled stream, an end time position of a main-program stream, and the like. The content ID of a CM-attached content is information that identifies a CM-attached content. The end time position of a CM-coupled stream is information that indicates a time position at which a reproduction of a CM-coupled stream has ended or been interrupted by a user. The end time position of a main-program stream is information that indicates a time position at which a reproduction of a main-program stream has ended or been interrupted by a user.

Figure 16:
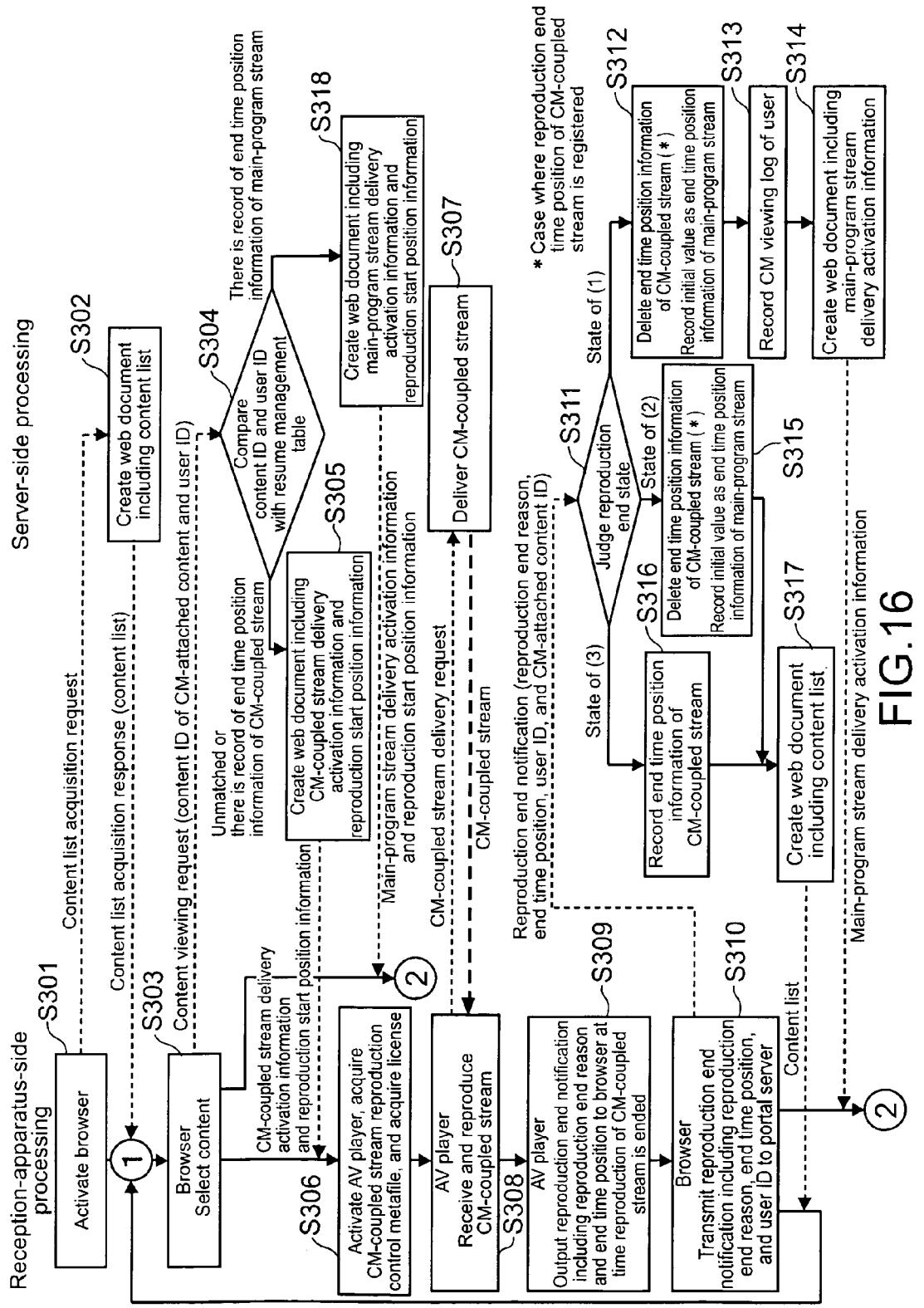
FIG. 16 is a sequence diagram showing a procedure of resume control in the stream reproduction according to Modified Example 1.
Figure 17:
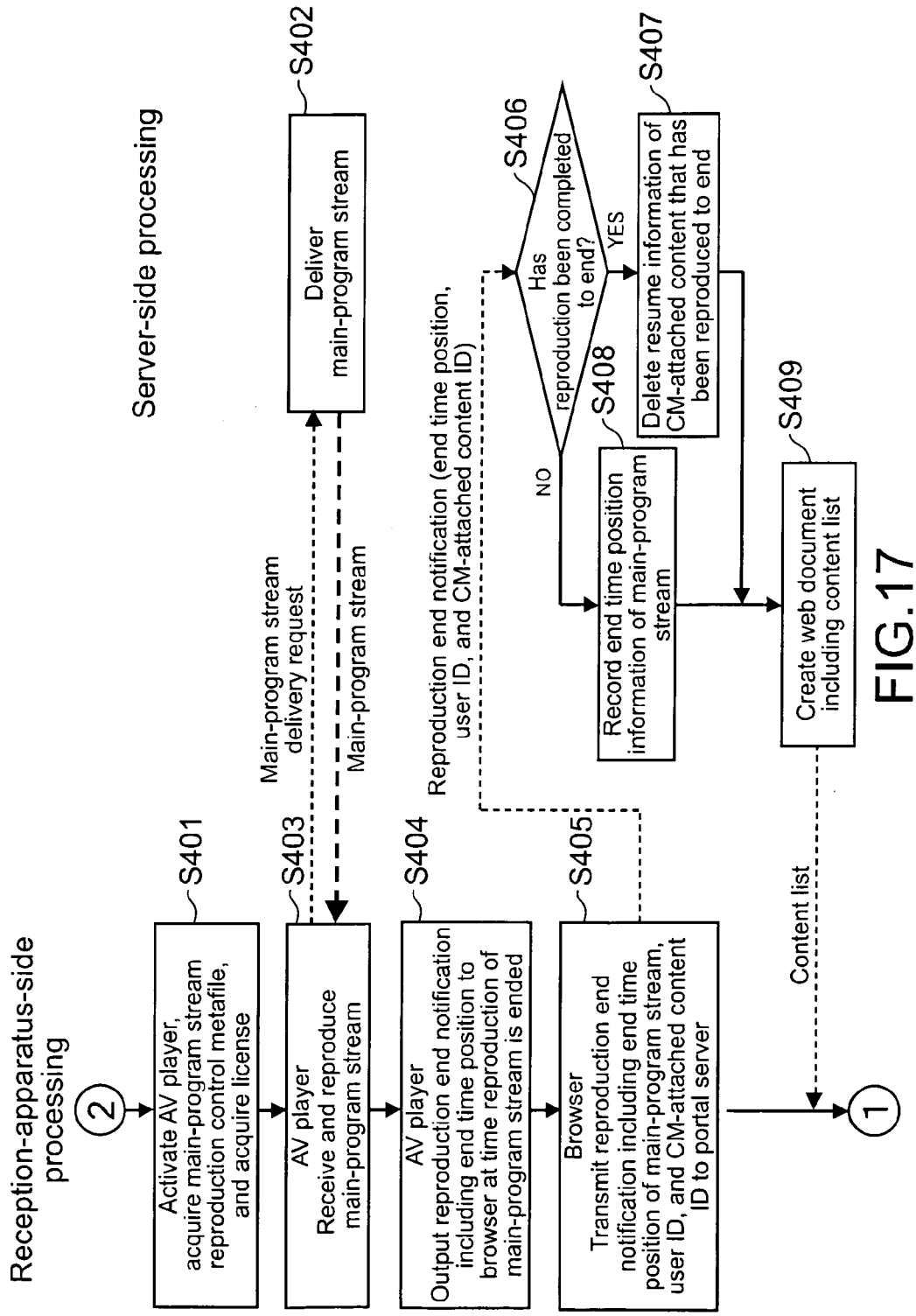
FIG. 17 is a sequence diagram showing a procedure of the resume control in the stream reproduction according to Modified Example 1 as in FIG. 16.

FIGS. 16 and 17 are sequence diagrams each showing a procedure of resume control of a CM-attached content.

Here, the browser 21 of the reception apparatus 20 corresponds to a reproduction end notification transmission section and a content-viewing request section, and the AV player 22 corresponds to a stream delivery request section. Further, the portal server 11 corresponds to a reproduction end notification reception section, a resume information storage section, and a reproduction resumption position notification section.

First, the browser 21 of the reception apparatus 20 is activated (FIG. 16: Step S301). The browser 21 transmits a content list acquisition request to the portal server 11 via the network 30. Upon receiving the content list acquisition request, the portal server 11 creates a web document including a content list and transmits it as a content list acquisition response to the browser 21 of the reception apparatus 20 (FIG. 16: Step S302).

The browser 21 of the reception apparatus 20 displays, on the display screen, the content list included in the content list acquisition response received from the portal server 11. The user uses the input section 72 to input instructions to select and reproduce a CM-attached content to view (reproduce) from the displayed content list (FIG. 16: Step S303). The browser 21 transmits a content viewing request including a content ID of the CM-attached content instructed to be reproduced by the user and a user ID to the portal server 11.

Upon receiving the content viewing request from the browser 21, the portal server 11 compares the content ID of the CM-attached content and the user ID included in the content viewing request with resume information recorded in the resume management table (FIG. 16: Step S304). When the CM-attached content instructed to be reproduced by the user is a CM-attached content that is instructed to be reproduced by the user for the first time, a combination of the content ID of the CM-attached content and the user ID included in the content viewing request is not registered in the resume management table (unmatched in Step S304). In this case, the portal server 11 searches the storage section thereof for delivery activation information for a CM-coupled stream associated with the content ID of the CM-attached content. The portal server 11 creates a web document including the searched CM-coupled stream delivery activation information and reproduction start position information as a content viewing response (FIG. 16: Step S305) and transmits it to the browser of the reception apparatus 20. The reproduction start position at this time is a head position of the CM-coupled stream.

The browser 21 extracts a reproduction control metafile URL of the CM-coupled stream from the CM-coupled stream delivery activation information included in the web document received from the portal server 11 and outputs an activation request including the reproduction control metafile URL to the AV player 22. Upon receiving the activation request, the AV player 22 transmits a reproduction control metafile acquisition request including the content ID of the CM-attached content to the reproduction control meta-server 13 based on the reproduction control metafile URL included in the activation request, and acquires a reproduction control metafile for the CM-coupled stream. Next, the AV player 22 extracts a DRM server URL and a license ID from the acquired CM-coupled stream reproduction control metafile and acquires a license for the CM-coupled stream from the DRM server 14 based on the DRM server URL and the license ID (FIG. 16: Step S306).

After that, the AV player 22 transmits a content acquisition request including a content URL of the CM-coupled stream extracted from the CM-coupled stream reproduction control metafile to the content server 12. Upon receiving the content acquisition request, the content server 12 transmits a relevant CM-coupled stream to the AV player 22 of the reception apparatus 20 based on the content URL of the CM-coupled stream included in the content acquisition request (FIG. 16: Step S307). The AV player 22 of the reception apparatus 20 receives the CM-coupled stream from the content server 12 and decrypts the encrypted CM-coupled stream with a content key of the license. The AV player 22 decodes the decrypted encoded data to obtain AV data, and outputs video and audio to the output section 71 via the input/output interface section 23. Accordingly, a reproduction of the CM-coupled stream is started (FIG. 16: Step S308).

Here, a case where a CM-coupled stream is reproduced to the end and a case where the reproduction is interrupted by a user instruction will be described.

When a reproduction of a CM-coupled stream is ended as in the case where the CM-coupled stream is reproduced to the end and ended or the reproduction thereof is interrupted by a user instruction, the AV player 22 transmits a reproduction end notification including reproduction end reason information, end time position, and the like to the browser 21 (FIG. 16: Step S309). Here, the reproduction end reason information is information that indicates one of the fact that a CM-coupled stream has been reproduced to the end to be automatically ended and the fact that the reproduction has been interrupted by a user instruction. The end time position is information that indicates a time position at which the reproduction has been ended/interrupted in the entire time length of the CM-coupled stream.

Upon receiving the reproduction end notification, the browser 21 extracts a return URL from the CM-coupled stream delivery activation information. The browser 21 transmits a reproduction end notification including access information in which the end time position of the CM-coupled stream notified by the AV player 22 is set as a query of the return URL and to which an end flag is added, the user ID, and the content ID of the CM-attached content to the portal server (FIG. 16: Step S310). Here, the end flag is a flag that the AV player 22 determines based on the reproduction end reason information and is a flag that identifies which of a reproduction end by a user operation and a reproduction end without a user operation the reproduction end reason is.

An example of the access information is as follows.

http://xxxxxxx?t=a,endflag=1

Here, a query character string starts with "?", and the end time position of the CM-coupled stream is stored in "a" connected to "?" via "=". "endflag" is an end flag, and "endflag=1" is an end flag that indicates that the reproduction has been ended by a user operation. Therefore, the query character string of the access information means that the reproduction of the CM-coupled stream has been ended at the time position "a" by a user instruction. The access information in a case where it is judged by the AV player 22 that the reproduction of the CM-coupled stream has been finished to the end without any user operation is as follows, for example.

http://xxxxxxx?t=b,endflag=0

Here, "b" is the reproduction end time position.

Upon receiving the reproduction end notification, the portal server 11 judges any of the following three states based on the query character string and the end flag of the access information included in the reproduction end notification (FIG. 16: Step S311).

(1) State where reproduction is ended without any user operation and end position is at end of CM-coupled stream (2) State where reproduction is interrupted by user operation and interrupted position is almost at end of CM-coupled stream (3) State where reproduction is interrupted by user operation and interrupted position is in midst of CM-coupled stream In the portal server 11, an interruption and end of a reproduction by a user operation are judged based on the end flag. Moreover, the state of "interrupted position is almost at end of CM-coupled stream" is judged based on whether a ratio of a reproduction time length to the entire time length of the CM-coupled stream is a predetermined value or more. The reproduction time length is a value obtained from the end time position as a query value, and the entire time length of the CM-coupled stream is obtained based on information managed in advance in the portal server 11.

Next, a case where the state of (1) is judged will be described.

First, the portal server 11 records, in the resume management table, an initial value as end time position information of a main-program stream constituting one CM-attached content with the CM-coupled stream (FIG. 16: Step S312). Here, the initial value of the end time position is "0", which indicates a head position of the main-program stream. Next, the portal server 11 records a CM viewing log of the user based on the information included in the reproduction end notification received from the browser 21 of the reception apparatus 20 (FIG. 16: Step S313). The CM viewing log includes information on a content ID of a CM-attached content whose CM-coupled stream has been completely viewed, a user ID, a viewing completion time, and the like. Subsequently, the portal server 11 creates a web document including main-program stream delivery activation information of the CM-attached content and transmits it to the browser 21 of the reception apparatus 20 (FIG. 16: Step S314). Operations that are carried out after the browser 21 receives the web document including the main-program stream delivery activation information will be described later.

Next, a case where the state of (2) is judged will be described.

The portal server 11 records, in the resume management table, an initial value as end time position information of a main-program stream constituting one CM-attached content with the CM-coupled stream (FIG. 16: Step S315). Subsequently, the portal server 11 creates a web document including a content list and transmits it to the browser 21 of the reception apparatus 20 (FIG. 16: Step S317). The browser 21 of the reception apparatus 20 returns to Step S303 and displays the content list received from the portal server 11 on the output section 71. After that, the user can again select a CM-attached content to view (reproduce) while looking at the displayed content list.

Here, a case where a reproduction of a CM-attached content that has been interrupted by a user operation is instructed again by the user will be described. The browser 21 receives an input from the user as a reproduction request of the CM-attached content and transmits a content viewing request including a content ID of the CM-attached content and a user ID to the portal server 11.

Upon receiving the content viewing request from the browser 21 of the reception apparatus 20, the portal server 11 compares the content ID of the CM-attached content and the user ID included in the content viewing request with the resume information recorded in the resume management table (FIG. 16: Step S304). When the CM-attached content selected by the user is a CM-attached content that has been selected by the user in the past, the content ID of the CM-attached content and the user ID included in the content viewing request are recorded in the resume management table in association with each other. In addition, the end time position information (initial value) of the main-program stream is recorded in the resume management table in association with the content ID of the CM-attached content and the user ID. In this case, the portal server 11 searches the storage section thereof for main-program stream delivery activation information of the CM-attached content selected by the user. The portal server 11 then creates a web document including the searched main-program stream delivery activation information and reproduction start position information (initial value) (FIG. 16: Step S318) and transmits it to the browser 21 of the reception apparatus 20. Operations that are carried out after the browser 21 receives the main-program stream delivery activation information from the portal server 11 will be described later.

Next, a case where the state of (3) is judged will be described.

In this case, the portal server 11 records the content ID of the CM-coupled stream, the user ID, and the end time position information included in the reproduction end notification received from the browser 21 in the resume management table in association with each other (FIG. 16: Step S316). Subsequently, the portal server 11 creates a web document including a content list and transmits it to the browser 21 of the reception apparatus 20 (FIG. 16: Step S317). The browser 21 of the reception apparatus 20 then returns to Step S303 and displays the content list received from the portal server 11 on the output section 71. After that, the user can again select a CM-attached content to view (reproduce) while looking at the displayed content list (FIG. 16: Step S303).

Here, a case where a reproduction of a CM-attached content that has been interrupted by a user operation is instructed again by the user will be described. The browser 21 receives an input from the user as a reproduction request of the CM-attached content and transmits a content viewing request including a content ID of the CM-attached content and a user ID to the portal server 11.

Upon receiving the content viewing request from the browser 21, the portal server 11 compares the content ID of the CM-attached content and the user ID included in the content viewing request with the resume information recorded in the resume management table (FIG. 16: Step S304). When the CM-attached content selected by the user is a CM-attached content that has been selected by the user in the past, the content ID of the CM-attached content and the user ID included in the content viewing request are recorded in the resume management table in association with each other. In addition, the end time position information of the CM-coupled stream is recorded in the resume management table in association with the content ID of the CM-attached content and the user ID. In this case, the portal server 11 creates a web document including, with the end time position information of the CM-coupled stream recorded in the resume management table as reproduction start position information, the reproduction start position information and the CM-coupled stream delivery activation information (FIG. 16: Step S305). Then, the portal server 11 transmits the web document to the browser 21 of the reception apparatus 20.

The browser 21 extracts a reproduction control metafile URL for the CM-coupled stream from the CM-coupled stream delivery activation information included in the web document received from the portal server 11 and outputs an activation request including the reproduction control metafile URL to the AV player 22. Upon receiving the activation request, the AV player 22 transmits a reproduction control metafile acquisition request including a content ID of the CM-attached content to the reproduction control meta-server 13 based on the reproduction control metafile URL included in the activation request, and acquires a reproduction control metafile for the CM-coupled stream. Next, the AV player 22 extracts a DRM server URL and a license ID from the acquired CM-coupled stream reproduction control metafile and acquires a license for reproducing the CM-coupled stream from the DRM server 14 based on the DRM server URL and the license ID (FIG. 16: Step S306).

After that, the AV player 22 transmits a content acquisition request including a content URL of the CM-coupled stream extracted from the CM-coupled stream reproduction control metafile and the reproduction start position information extracted from the CM-coupled stream delivery activation information to the content server 12. Upon receiving the content acquisition request, the content server 12 transmits a part from after the reproduction start position of the CM-coupled stream to the AV player 22 of the reception apparatus 20 based on the content URL of the CM-coupled stream and the reproduction start position information included in the content acquisition request (FIG. 16: Step S307).

The AV player 22 of the reception apparatus 20 receives the CM-coupled stream from the reproduction start position from the content server 12 and decrypts the encrypted CM-coupled stream with a content key of the license. The AV player 22 decodes the decrypted encoded data to obtain AV data, and outputs video and audio to the output section 71 via the input/output interface section 23. Accordingly, a reproduction of the CM-coupled stream is resumed from the position at which the reproduction has been interrupted by the user operation (FIG. 16: Step S308).

When the CM-coupled stream is reproduced to the end without being interrupted by a user operation, the AV player notifies the browser 21 to that effect together with the end time position information of the reproduction of the CM-coupled stream (FIG. 16: Step S309). The browser 21 extracts a return URL from the CM-coupled stream delivery activation information. The browser 21 then creates access information in which the end time position information of the CM-coupled stream notified from the AV player 22 is set as a query of the return URL and to which an end flag indicating a reproduction end without any user operation is added. The access information in this case is as follows.

http://xxxxxxx?t=b,endflag=0

Here, "b" is the reproduction end time position.

Then, the browser 21 transmits a reproduction end notification including the access information, its own user ID, and the content ID of the CM-attached content to the portal server 11 (FIG. 16: Step S310).

Upon receiving the reproduction end notification, the portal server 11 judges the "(1) State where reproduction is ended without any user operation and end position is at end of CM-coupled stream" based on the access information included in the reproduction end notification (FIG. 16: Step S311). As a result, the portal server 11 deletes the end time position information of the CM-coupled stream recorded in the resume management table and records an initial value as end time position information of a main-program stream constituting one CM-attached content with the CM-coupled stream (FIG. 16: Step S312). Operations after that are the same as those described above.

Further, when a reproduction of a CM-coupled stream is interrupted by a user operation almost at the end of the CM-coupled stream, the AV player 22 transmits a reproduction end notification including reproduction end reason information, end time position information, and the like to the browser 21 (FIG. 16: Step S309). Upon receiving the reproduction end notification, the browser 21 extracts a return URL from the CM-coupled stream delivery activation information. The browser 21 creates access information in which the end time position information of the CM-coupled stream notified by the AV player 22 is set as a query of the return URL and to which an end flag indicating a reproduction end by a user operation is added. The access information in this case becomes "http://xxxxxxx?t=b,endflag=1". Then, the browser 21 transmits a reproduction end notification including the access information, its own user ID, and a content ID of the CM-attached content to the portal server 11 (FIG. 16: Step S310).

Upon receiving the reproduction end notification, the portal server 11 judges the "(2) State where reproduction is interrupted by user operation and interrupted position is almost at end of CM-coupled stream" based on the access information included in the reproduction end notification (FIG. 16: Step S311). As a result, the portal server 11 deletes the end time position information of the CM-coupled stream recorded in the resume management table and records an initial value as end time position information of a main-program stream constituting one CM-attached content with the CM-coupled stream (FIG. 16: Step S315). Operations after that are the same as those described above.

Next, operations carried out after the browser 21 receives the web document including the main-program stream delivery activation information from the portal server 11 will be described with reference to FIG. 17.

Upon receiving the main-program stream delivery activation information, the browser 21 outputs an activation request including the delivery activation information to the AV player 22. The AV player 22 is activated in response to the activation request from the browser 21 and extracts a reproduction control metafile URL for the main-program stream from the delivery activation information included in the activation request. The AV player 22 transmits a reproduction control metafile acquisition request to the reproduction control meta-server 13 based on the main-program stream reproduction control metafile URL. Upon receiving the reproduction control metafile acquisition request, the reproduction control meta-server 13 transmits a relevant reproduction control metafile for the main-program stream to the AV player 22 of the reception apparatus 20 as a reproduction control metafile acquisition response.

Next, the AV player 22 extracts a DRM server URL and a license ID from the acquired main-program stream reproduction control metafile. The AV player 22 establishes a secure communication path with the DRM server 14 based on the DRM server URL and transmits a license acquisition request including the license ID to the DRM server 14. Accordingly, the AV player 22 acquires a license including a content key corresponding to the license ID from the DRM server 14 (FIG. 17: Step S401).

After that, the AV player 22 transmits a content acquisition request including a content URL of the main-program stream to the content server 12. Upon receiving the content acquisition request, the content server 12 transmits a relevant main-program stream to the AV player 22 of the reception apparatus 20 based on the content URL of the main-program stream included in the content acquisition request (FIG. 17: Step S402). The AV player 22 receives the main-program stream from the content server 12 and decrypts the encrypted main-program stream with the content key of the license. The AV player 22 decodes the decrypted encoded data to obtain AV data, and outputs video and audio to the output section 71 via the input/output interface section 23. Accordingly, a reproduction of the main-program stream is started (FIG. 17: Step S403).

Here, a case where a main-program stream is reproduced to the end and a case where the reproduction is interrupted by a user instruction will be described.

When a reproduction of a main-program stream is ended as in the case where the main-program stream is reproduced to the end and ended or the reproduction thereof is interrupted by a user instruction similar to the case of the CM-coupled stream, the AV player 22 transmits a reproduction end notification including reproduction end time position information to the browser 21 (FIG. 17: Step S404). Upon receiving the reproduction end notification, the browser 21 extracts a return URL from the main-program stream delivery activation information. The browser 21 transmits a reproduction end notification including access information in which the end time position information of the main-program stream notified by the AV player 22 is set as a query of the return URL, a user ID, and a content ID of a CM-attached content to the portal server 11 (FIG. 17: Step S405). An example of the access information at this time is as follows.

http://xxxxxxx?t=a

Here, "a" is the reproduction end time position.

Upon receiving the reproduction end notification of the main-program stream, the portal server 11 judges whether the main-program stream has been reproduced almost completely to the end based on the access information included in the reproduction end notification (FIG. 17: Step S406). This judgment is made based on whether a ratio of a reproduction time length to the entire time length of the main-program stream is a predetermined value or more. Specifically, if the ratio of the reproduction time length to the entire time length of the main-program stream is a predetermined value or more, it is judged that the main-program stream has been reproduced almost completely to the end. Here, the reproduction time length is a value obtained from the end time position as a query value, and the entire time length of the main-program stream is obtained based on information managed in advance in the portal server 11.

When judged that the main-program stream has been reproduced almost completely to the end, the portal server 11 deletes the resume information having the user ID and the content ID of the CM-attached content included in the reproduction end notification from the resume information recorded in the resume management table (FIG. 17: Step S407). After that, the portal server 11 creates a web document including a content list (FIG. 17: Step S409) and transmits it to the browser 21 of the reception apparatus 20.

On the other hand, when judged that the main-program stream has not been reproduced almost completely to the end, the portal server 11 extracts end time position information from the access information included in the reproduction end notification received from the browser 21 and records it in the resume management table as end time position information of the main-program stream (FIG. 17: Step S408). After that, the portal server 11 creates a web document including a content list (FIG. 17: Step S409) and transmit it to the browser 21 of the reception apparatus 20.

The browser 21 displays the content list included in the web document acquired from the portal server 11 on the output section 71 via the input/output interface section 23. Assuming that a reproduction instruction of the same CM-attached content is input again from the displayed content list (FIG. 17: Step S401), the browser 21 transmits a content viewing request including the content ID of the CM-attached content instructed to be reproduced and the user ID to the portal server 11.

The portal server 11 compares the content ID of the CM-attached content and the user ID included in the content viewing request received from the browser 21 with the resume information recorded in the resume management table (FIG. 16: Step S304). Currently, the resume information having the content ID of the CM-attached content and the user ID included in the content viewing request is recorded in the resume management table, and the resume information includes end time position information of the main-program stream. In this case, the portal server 11 extracts the end time position information of the main-program stream from the resume management table. Moreover, the portal server 11 extracts main-program stream delivery activation information of the CM-attached content from the storage section thereof. The portal server 11 then creates a web document including, with the end time position information of the main-program stream as reproduction start position information, the reproduction start position information and the main-program stream delivery activation information (FIG. 16: Step S318) and transmits the web document to the browser 21 of the reception apparatus 20.

Upon receiving the web document, the browser 21 extracts a reproduction control metafile URL for the main-program stream from the main-program stream delivery activation information included in the web document and outputs an activation request including the reproduction control metafile URL to the AV player 22. Upon receiving the activation request, the AV player 22 acquires a reproduction control metafile for the main-program stream and then acquires a license for the main-program stream as described above (FIG. 17: Step S401).

After that, the AV player 22 transmits a content acquisition request including a content URL of the main-program stream extracted from the main-program stream delivery activation information and the reproduction start position information extracted from the main-program stream delivery activation information to the content server 12. Upon receiving the content acquisition request, the content server 12 transmits a part from after the reproduction start position of the main-program stream to the AV player 22 of the reception apparatus 20 based on the content URL of the main-program stream and the reproduction start position information included in the content acquisition request (FIG. 17: Step S402).

The AV player 22 of the reception apparatus 20 receives the main-program stream from the reproduction start position from the content server 12 and decrypts the encrypted main-program stream with a content key of the license. The AV player 22 decodes the decrypted encoded data to obtain AV data, and outputs video and audio to the output section 71 via the input/output interface section 23. Accordingly, a reproduction of the main-program stream is resumed from the position at which the reproduction has been interrupted by the user operation (FIG. 17: Step S403).

By the resume function of the stream reproduction described heretofore, when reproductions of a CM-coupled stream and a main-program stream of a CM-attached content are interrupted by a user operation but the reproduction of the same CM-attached content is instructed again thereafter, the reproductions of the CM-coupled stream and the main-program stream can be resumed from a time position at which the reproduction has been interrupted.

It should be noted that Modified Example 1 is not limited to the case of delivering a CM-coupled stream and is also applicable to a case of delivering a single CM stream.

Modified Example 2

Next, a method of selecting a CM-coupled stream to be delivered to the reception apparatus 20 based on a user preference will be described.

Figure 18:
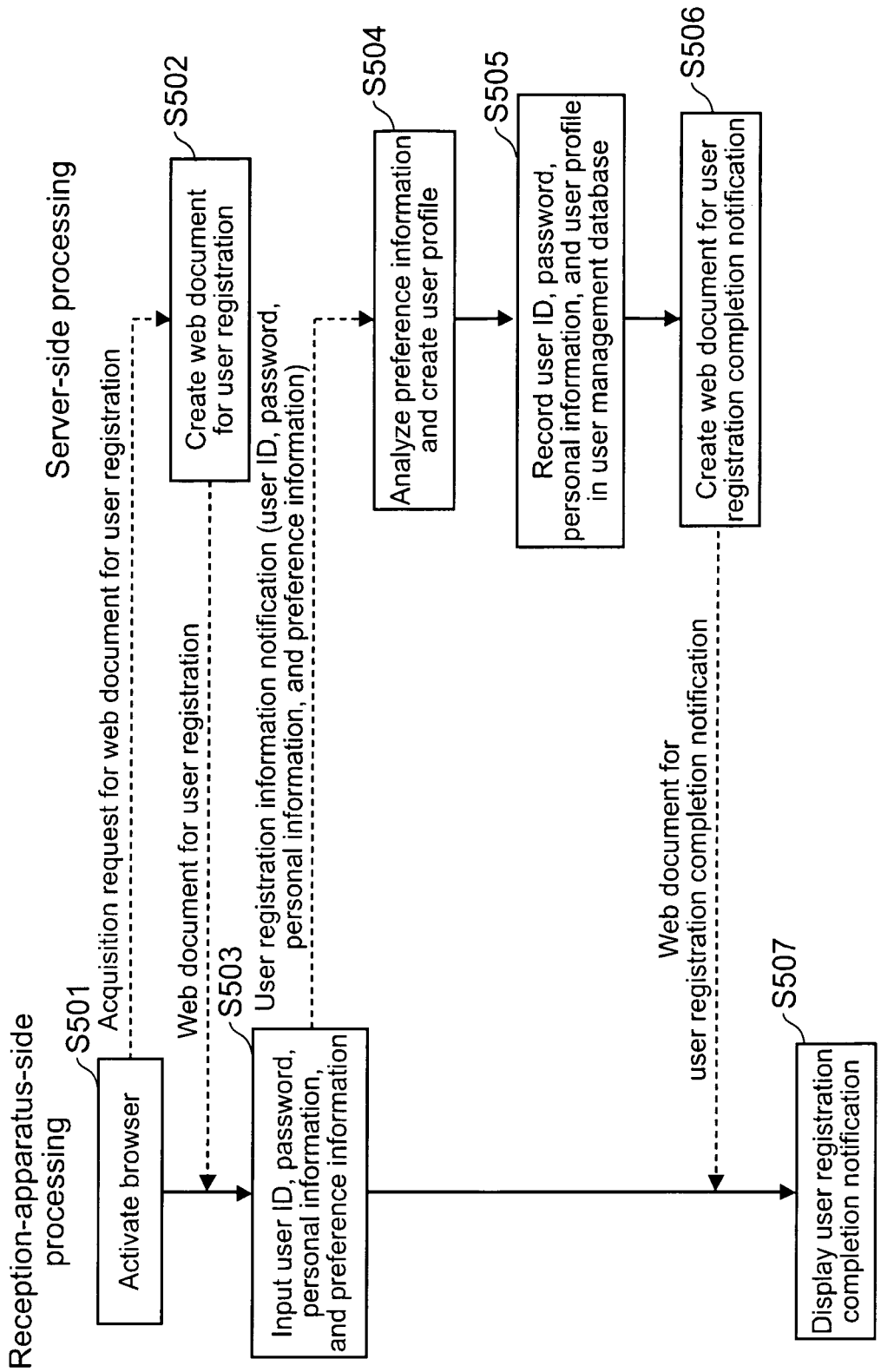
FIG. 18 is a sequence diagram showing a flow of processing at a time of a user registration to a portal server according to Modified Example 2.

FIG. 18 is a sequence diagram showing a flow of processing at a time of a user registration to the portal server 11.

Here, the browser 21 of the reception apparatus 20 corresponds to a user preference information provision section and a delivery activation information acquisition section, and the portal server 11 corresponds to a user preference storage section and a delivery activation information transmission section.

First, the browser 21 of the reception apparatus 20 is activated. The browser 21 transmits an acquisition request for a web document for a user registration necessary for using a service provided by the portal server 11 to the portal server 11 (Step S501). The portal server 11 creates the web document for a user registration in response to the request and transmits it to the browser 21 of the reception apparatus 20 (Step S502).

The browser 21 of the reception apparatus 20 outputs the received web document for a user registration to the output section 71 via the input/output interface section 23. In the web document for a user registration, a plurality of input columns for the user to input a user ID, a password, personal information, preference information, and the like are provided. When various types of information are input to those input columns by the user using the input section 72 (Step S503) and a registration button provided in the web document for a user registration is operated, the browser 21 transmits a user registration information notification including the information input to the input columns to the portal server 11.

Upon receiving the user registration information notification, the portal server 11 creates a user profile by analyzing the preference information included in the user registration information notification (Step S504). The user profile is a profile that stores the preference information input by the user. Next, the portal server 11 extracts the user ID, the password, and the personal information from the user registration information notification and records them in a user management database together with the user profile as a set of user registration information while associating them with one another (Step S505). After that, the portal server creates a web document for notifying a user registration completion (Step S506) and transmits it to the browser 21 of the reception apparatus 20. The browser 21 of the reception apparatus 20 displays the web document for a user registration completion notification and notifies the user of a user registration completion (Step S507).

By repeating such a procedure for each user of the plurality of reception apparatuses 20, a plurality of pieces of user registration information are recorded in the user management database of the portal server 11. These are the operations regarding the user registration.

Next, operation up until a CM-coupled stream is reproduced in the reception apparatus 20 after the user registration will be described.

Figure 19:
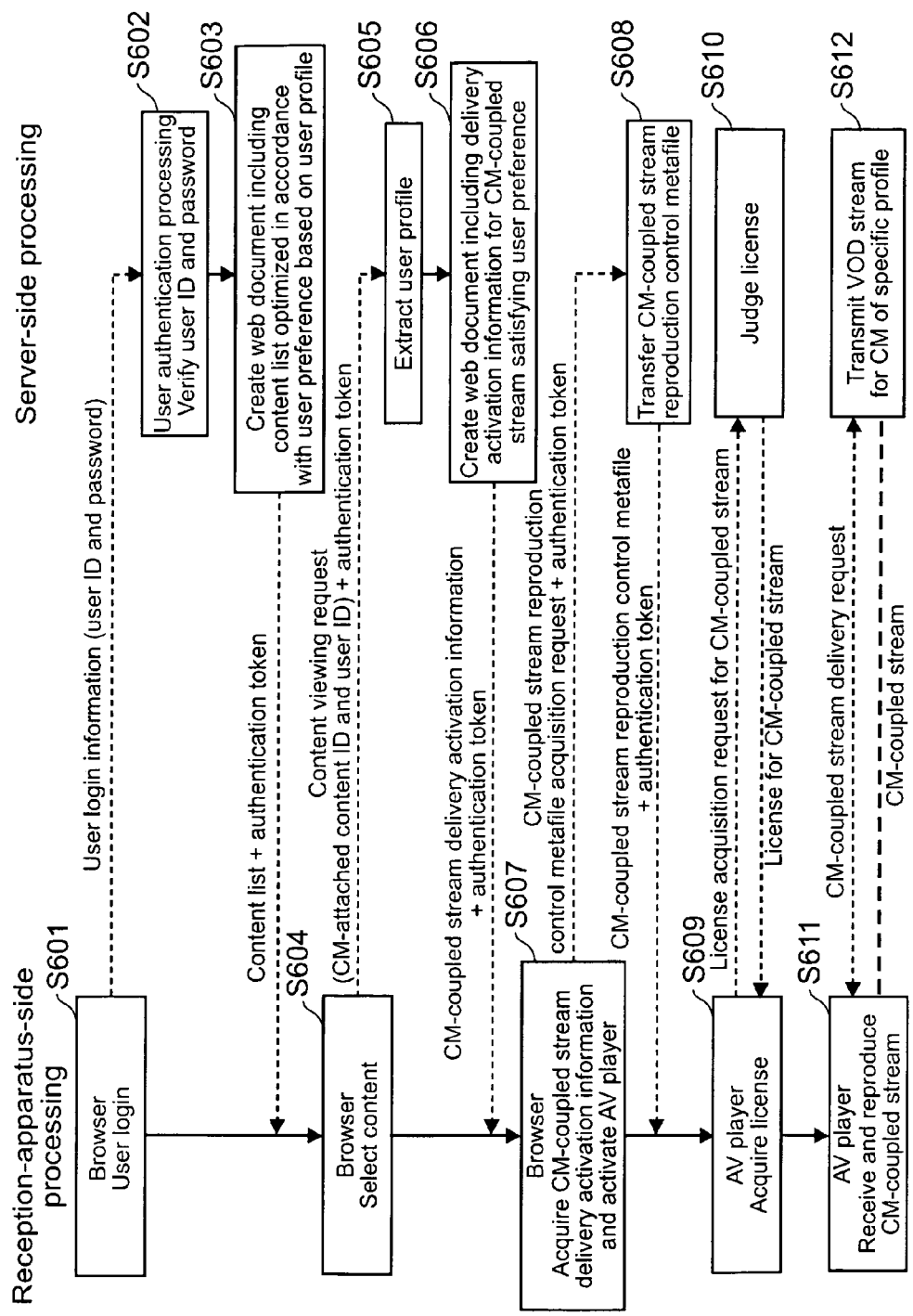
FIG. 19 is a sequence diagram showing processes from a selection of a CM-attached content to a reproduction of a CM-coupled stream in the reception apparatus after the user registration according to Modified Example 2.
Figure 20:
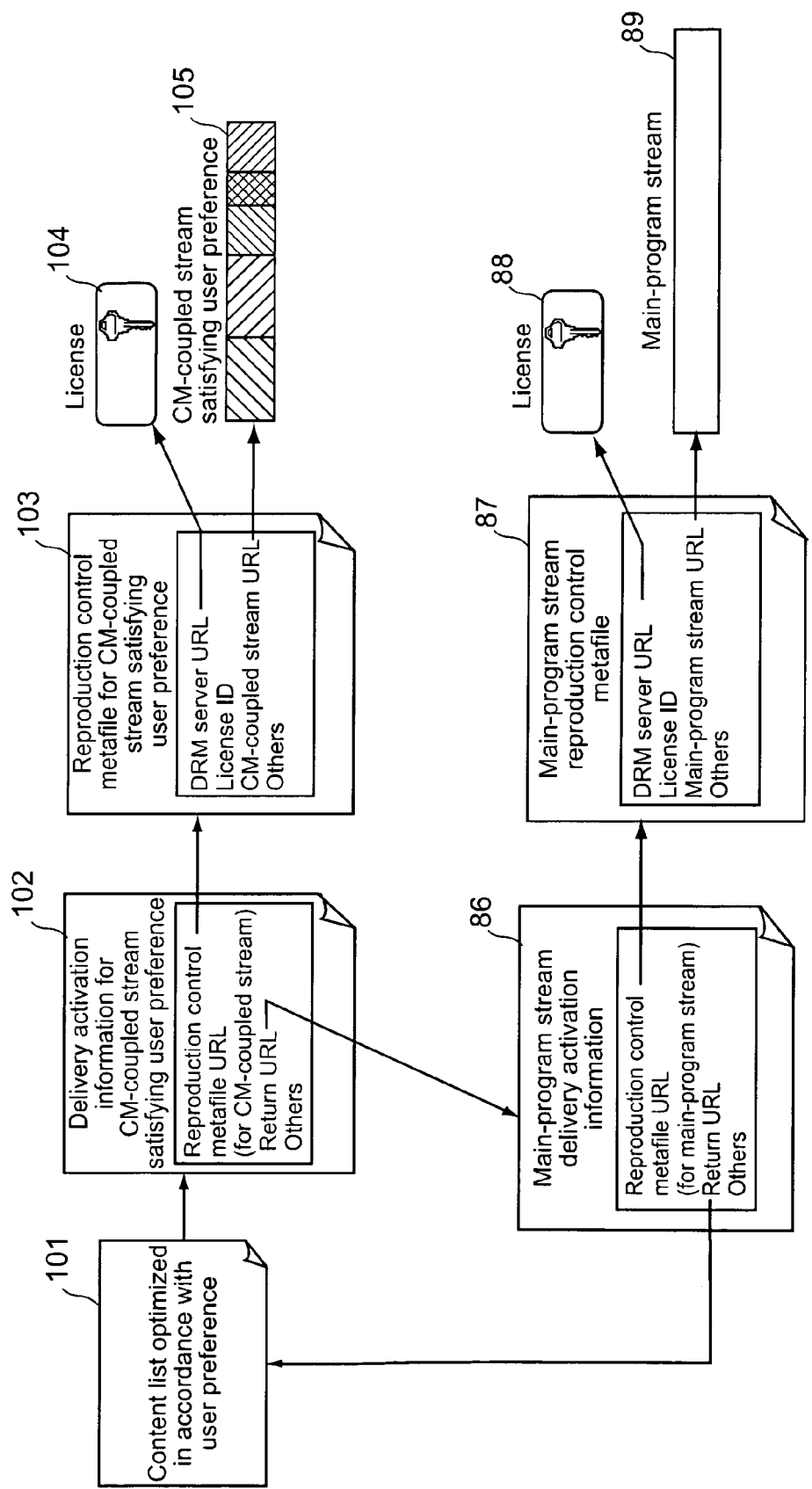
FIG. 20 is a diagram showing a relationship among delivery activation information, reproduction control metafiles, licenses, a CM-coupled stream, and a main-program stream according to Modified Example 2.

FIG. 19 is a sequence diagram showing processes from a selection of a CM-attached content to a reproduction of a CM-coupled stream in the reception apparatus 20 after the user registration according to Modified Example 2. FIG. 20 is a diagram showing a relationship among delivery activation information, reproduction control metafiles, licenses, a CM-coupled stream, and a main-program stream according to Modified Example 2.

First, the browser 21 of the reception apparatus 20 is activated. The browser 21 acquires a web document for login for using the service provided by the portal server 11 and displays it on the display screen. The user of the reception apparatus 20 uses the input section 72 to input a user ID and a password to a login screen. The browser 21 transmits user login information including the user ID and the password input to the login screen to the portal server 11 (Step S601).

Upon receiving the user login information, the portal server 11 collates the user ID and the password included in the user login information with user registration information recorded in the user management database and performs user authentication (Step S602). When the user ID and the password included in the user login information do not match any of the user registration information recorded in the user management database and the user authentication has thus failed, the portal server 11 creates a web document including a message indicating a user authentication failure and transmits it to the browser 21.

When the user authentication has succeeded, the portal server 11 extracts a user profile of that user from the user management database and creates a web document including a content list optimized in accordance with a preference of the user based on the preference information stored in the user profile (Step S603). The content list optimized in accordance with the user preference is, for example, a content list that lists contents (CM-attached contents) satisfying a user preference based on a display format and the like or a content list constituted only of contents satisfying the user preference. The portal server 11 transmits the web document including such a content list optimized in accordance with the user preference to the browser 21 together with an authentication token that is information for proving that the user authentication has been made.

The browser 21 of the reception apparatus 20 outputs the content list included in the web document received from the portal server 11 to the output section 71 via the input/output interface section 23. When instructions to select and reproduce a CM-attached content to view in the optimized content list 101 is input by the user using the input section 72 (Step S604), the browser 21 transmits a content viewing request including a content ID of the CM-attached content instructed to be reproduced and the user ID, and the authentication token to the portal server 11.

The portal server 11 extracts, based on the content ID of the CM-attached content and the user ID included in the content viewing request received from the reception apparatus 20, a user profile in the corresponding user registration information from the user management database (Step S605). The portal server 11 selects a CM-coupled stream satisfying the user preference based on the preference information stored in the extracted user profile. A mechanism of selecting a CM-coupled stream that satisfies a user preference is as follows, for example.

CM-coupled streams stored in the content server 12 are categorized and managed for each attribute of a CM target product in the portal server 11. For example, when target products of CM1, CM2, and CM3 are a "car from xx", "cosmetics from yy", and "movie zz", respectively, attributes of "car", "cosmetics", and "audio/visual" are imparted to CM1, CM2, and CM3, respectively. Moreover, the portal server 11 judges a preference attribute based on the preference information stored in the user profile. For example, when "drive" is stored in the user profile as the preference information, the portal server 11 determines that the preference attribute of the user is "car" and judges that a CM that satisfies the preference attribute of the user is a CM on the target product "car from xx".

When one CM-coupled stream in which a plurality of CMs are coupled is delivered to the user, an attribute of each of the CM target products is imparted to the one CM-coupled stream. In this case, the portal server 11 judges a CM-coupled stream having even one attribute that satisfies the user preference attribute as a CM-coupled stream that satisfies the user preference attribute. Alternatively, the portal server 11 compares, using an attribute of a CM target product at a head of the CM-coupled stream as a representative attribute of the CM-coupled stream, the representative attribute of the CM-coupled stream with the user preference attribute to judge a CM-coupled stream that satisfies the user preference attribute.

The portal server 11 creates a web document including delivery activation information 102 for the thus-judged CM-coupled stream that satisfies the user preference attribute (Step S606) and transmits it to the browser 21 of the reception apparatus 20 together with the authentication token.

Upon receiving the CM-coupled stream delivery activation information 102 and the authentication token, the browser 21 of the reception apparatus 20 outputs an activation request including the CM-coupled stream delivery activation information 102 to the AV player 22 together with the authentication token. The AV player 22 is activated in response to the activation request from the browser 21 and extracts a reproduction control metafile URL for the CM-coupled stream from the CM-coupled stream delivery activation information 102 included in the activation request. The AV player 22 transmits a reproduction control metafile acquisition request addressed to the reproduction control metafile URL to the reproduction control meta-server 13 together with the authentication token (Step S607).

Upon receiving the reproduction control metafile acquisition request, the reproduction control meta-server 13 transmits, as a reproduction control metafile acquisition response, a relevant reproduction control metafile 103 for the CM-coupled stream to the AV player 22 of the reception apparatus 20 together with the authentication token (Step S608).

The AV player 22 analyzes the acquired CM-coupled stream reproduction control metafile 103 and extracts a DRM server URL and a license ID. The AV player 22 establishes a secure communication path with the DRM server 14 based on the DRM server URL and transmits a license acquisition request including the license ID to the DRM server 14. Accordingly, the AV player 22 acquires a license 104 including a content key corresponding to the license ID from the DRM server 14 (Steps S609 and S610).

After acquiring the license 104, the AV player 22 transmits a content acquisition request including a content URL of the CM-coupled stream to the content server 12 and receives a CM-coupled stream 105 from the content server 12. Subsequently, the AV player 22 decrypts the encrypted CM-coupled stream 105 with the content key of the license. The AV player 22 then decodes the decrypted data to restore AV data; and outputs the decoded AV data to the output section 71 via the input/output interface section 23. Accordingly, a reproduction of the CM-coupled stream 105 is started (Steps S611 and S612).

Operations carried out at a time the reception apparatus 20 receives and reproduces a main-program stream are the same as those of the first embodiment.

As described above, according to Modified Example 2, a CM-coupled stream that satisfies a user preference can be selected and delivered to the reception apparatus 20, and a CM effect can be enhanced.

It should be noted that Modified Example 2 is applicable to not only a case of delivering a CM-coupled stream but also a case of delivering a single CM stream.

Modified Example 3

Next, a method of switching CM-coupled streams to be delivered to the reception apparatus 20 based on a user preference in a case where the reception apparatus 20 uses ECG metadata will be described.

Figure 21:
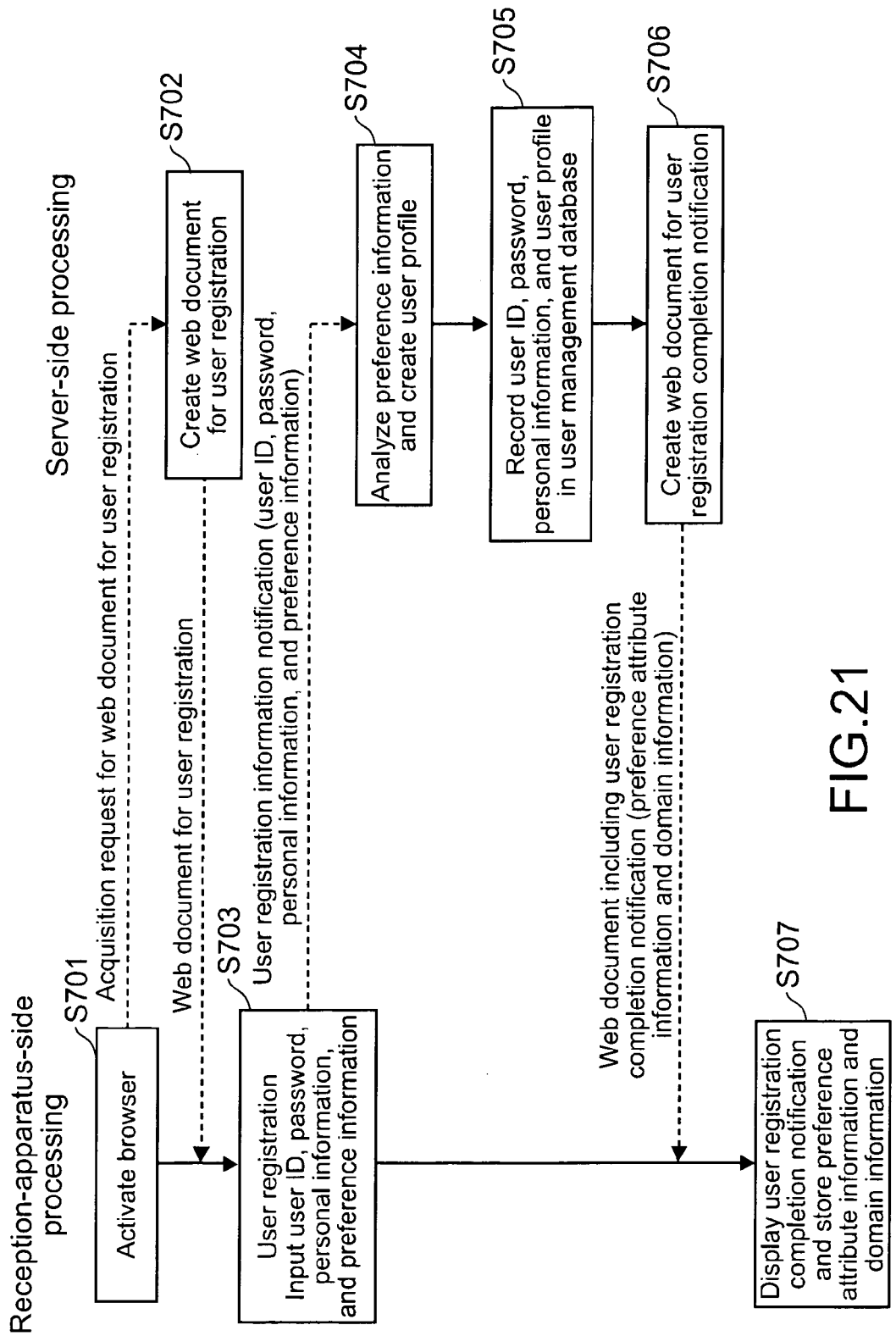
FIG. 21 is a sequence diagram showing a flow of processing at a time of a user registration to a portal server according to Modified Example 3.

FIG. 21 is a sequence diagram showing a flow of processing at a time of a user registration to the portal server 11 according to Modified Example 3.

Here, the AV player 22 of the reception apparatus 20 corresponds to a second reproduction control information acquisition section.

In this sequence, operations that are carried out from a time the reception apparatus 20 requests an acquisition of a web document including a user registration screen from the portal server 11 (Step S701) to a time the portal server registers information including a user ID, a password, personal information, and a user profile in the user management database (Step S705) are the same as those of Steps S501 to S505 of FIG. 18.

After registering the user ID, the password, the personal information, and the user profile in the user management database, the portal server 11 judges a user preference attribute corresponding to the preference information stored in the user profile in accordance with a predetermined rule. The portal server 11 creates a web document for a user registration completion notification including preference attribute information that identifies the preference attribute and domain information that specifies an industrialist of the content delivery service and transmits it to the browser 21 of the reception apparatus 20 (Step S706).

Upon receiving the web document for a user registration completion notification, the browser 21 of the reception apparatus 20 extracts the preference attribute information and the domain information from the web document for a user registration completion notification and stores them in the storage 25 of the reception apparatus 20. It should be noted that the domain information that specifies an industrialist of the content delivery service may be embedded into the web document for a user registration completion notification and transmitted to the browser 21 of the reception apparatus 20 so that the browser 21 of the reception apparatus 20 extracts the domain information from the web document for a user registration completion notification, or the domain information may be extracted from a URL of the received web document for a user registration completion notification by the browser 21 of the reception apparatus 20 instead of being embedded into the web document for a user registration completion notification. These are the operations at the time of the user registration.

Next, operations up to a reception and a reproduction of a CM-coupled stream in the reception apparatus 20 after the user registration will be described.

Here, ECG metadata adopted in Modified Example 3 will be described. FIG. 22 is an explanatory diagram of the ECG metadata of each content according to Modified Example 3. As shown in the figure, the ECG metadata of each content is constituted of a content ID, a content title, a content overview, a genre, a content time length, a main-program stream reproduction control metafile URL, a CM-coupled stream reproduction control metafile URL, a license ID for a CM-coupled stream, a license ID for a main-program stream, a preference attribute-specific reproduction availability flag, and the like. The preference attribute-specific reproduction availability flag is a flag that sets effectiveness/ineffectiveness of a switch of CM-coupled streams corresponding to the preference attribute. The ECG processing section 24 of the reception apparatus 20 acquires latest ECG metadata from the ECG meta-server 15 and stores it in the storage 25. For example, the ECG processing section 24 accesses the ECG meta-server 15 periodically or every time it is activated to obtain the latest ECG metadata.

Figure 23:
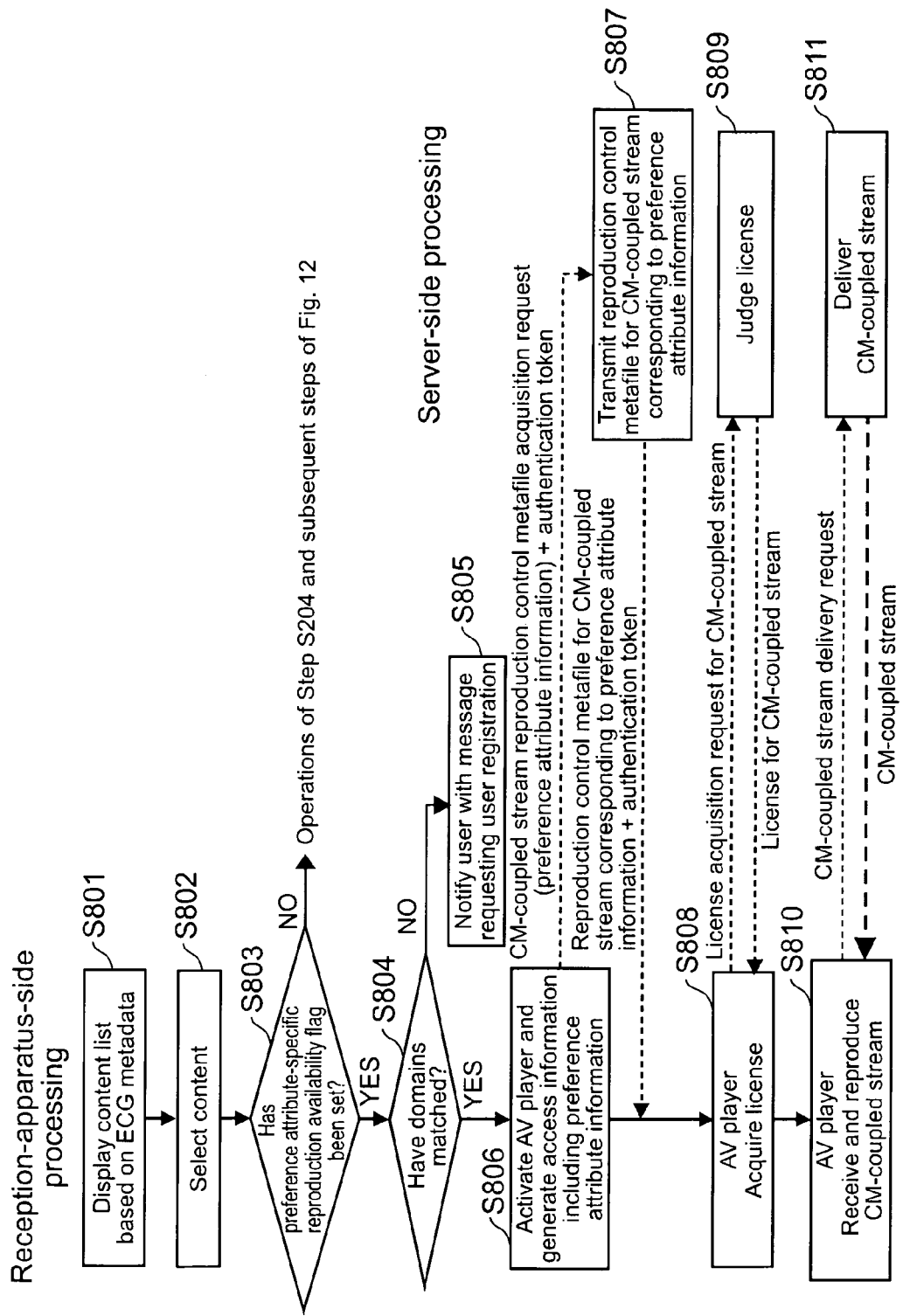
FIG. 23 is a sequence diagram showing a flow of processing up to a reception and a reproduction of a CM-coupled stream in the reception apparatus after the user registration according to Modified Example 3.

FIG. 23 is a sequence diagram showing a flow of processing up to a reception and a reproduction of a CM-coupled stream in the reception apparatus 20 after the user registration according to Modified Example 3.

First, in the reception apparatus 20, a display request for a content navigation screen is input by the user using the input section 72. Upon receiving the display request, the ECG processing section 24 displays the content navigation screen on the output section 71 of the reception apparatus 20 based on ECG metadata stored in the storage 25 (Step S801). The content navigation screen is a screen that displays thereon a title, an overview, a genre, a time length, and the like of viewable CM-attached contents and prompts the user to select a content.

When a CM-attached content that the user wishes to view is selected using the input section 72 and a reproduction instruction is input on the content navigation screen (Step S802), the ECG processing section 24 checks the preference attribute-specific reproduction availability flag in the ECG metadata of that CM-attached content (Step S803). When the preference attribute-specific reproduction availability flag is not set, a delivery and a reproduction of a CM-coupled stream are performed by the same procedure as in Step S204 and subsequent steps of FIG. 12. Specifically in this case, in the reception apparatus 20, an acquisition and a reproduction of a CM-coupled stream are performed using a CM-coupled stream reproduction control metafile URL and a license ID included in ECG metadata of a relevant CM-attached content stored in the storage 25.

In contrast, when the preference attribute-specific reproduction availability flag is set, the ECG processing section 24 checks a CM-coupled stream reproduction control metafile URL in the ECG metadata. The ECG processing section checks whether the domain information in the URL matches domain information stored in the storage 25, that has been acquired at a time the web document for a user registration completion notification is received (Step S804).

In the content delivery service, the domain information of the web document for a user registration completion notification is the same as the domain information used for the CM-coupled stream reproduction control metafile URL in the ECG metadata. Therefore, the pieces of domain information match as long as it is a reception apparatus 20 for which the user registration has been completed. On the other hand, unmatched domain information means that there is a possibility that the user of the reception apparatus 20 has not completed the user registration. In the latter case, the ECG processing section 24 displays a message on the output section 71 of the reception apparatus 20 to prompt the user to complete the user registration (Step S805).

When the pieces of domain information match, the ECG processing section 24 outputs an activation request including the CM-coupled stream reproduction control metafile URL in the ECG metadata and the preference attribute information in the user registration completion notification received from the portal server 11 to the AV player 22. The AV player 22 is activated in response to the activation request from the ECG processing section 24 and generates access information in which the preference attribute information included in the activation request is set as a query of the CM-coupled stream reproduction control metafile URL included in the activation request. The AV player 22 then transmits a reproduction control metafile acquisition request for the CM-coupled stream to the reproduction control meta-server 13 together with an authentication token that is information for proving that the user registration has been completed based on the access information (Step S806).

Upon receiving the reproduction control metafile acquisition request from the reception apparatus 20, the reproduction control meta-server 13 judges whether the authentication token is included in the reproduction control metafile acquisition request. When the authentication token is not included, the reproduction control meta-server 13 regards the reproduction control metafile acquisition request as a request from an unregistered user and transmits only a notification notifying to that effect to the reception apparatus 20 and not the reproduction control metafile.

When the authentication token is included, the reproduction control meta-server 13 regards the reproduction control metafile acquisition request as a request from a registered user. The reproduction control meta-server 13 then searches for a CM-coupled stream reproduction control metafile associated with the preference attribute information set as the query of the CM-coupled stream reproduction control metafile URL. In other words, in the storage section of the reproduction control meta-server 13, the preference attribute information and the content ID of the CM-coupled stream are stored in association with each other and the CM-coupled stream reproduction control metafile is stored in association with the content ID of the CM-coupled stream. The reproduction control meta-server 13 extracts the preference attribute information set as the query of the reproduction control metafile URL received from the reception apparatus 20 and extracts a content ID of the CM-coupled stream associated with the preference attribute information from the storage section. Then, the reproduction control meta-server 13 extracts the CM-coupled stream reproduction control metafile associated with the content ID from the storage section and transmits a reproduction control metafile acquisition response including the reproduction control metafile to the reception apparatus 20 together with the authentication token (Step S807). After that, the process of acquiring a license and the process of acquiring and reproducing a CM-coupled stream are carried out in the same manner as in Step S205 and subsequent steps of FIG. 12 (Steps S808 to S811).

Operations of the reception apparatus 20 at a time of receiving and reproducing a main-program stream are the same as those of the second embodiment.

As described above, according to Modified Example 3, a CM-coupled stream that satisfies a user preference can be selected and delivered to the reception apparatus 20 as in Modified Example 2, and a CM effect can be enhanced. Moreover, on/off of a selection of a CM-coupled stream that satisfies a user preference can be switched by setting the preference attribute-specific reproduction availability flag in ECG metadata.

Modified Example 4

Next, another method of switching CM-coupled streams to be delivered to the reception apparatus 20 based on a user preference in a case where the reception apparatus 20 uses ECG metadata as in Modified Example 3 will be described as Modified Example 4.

Figure 24:
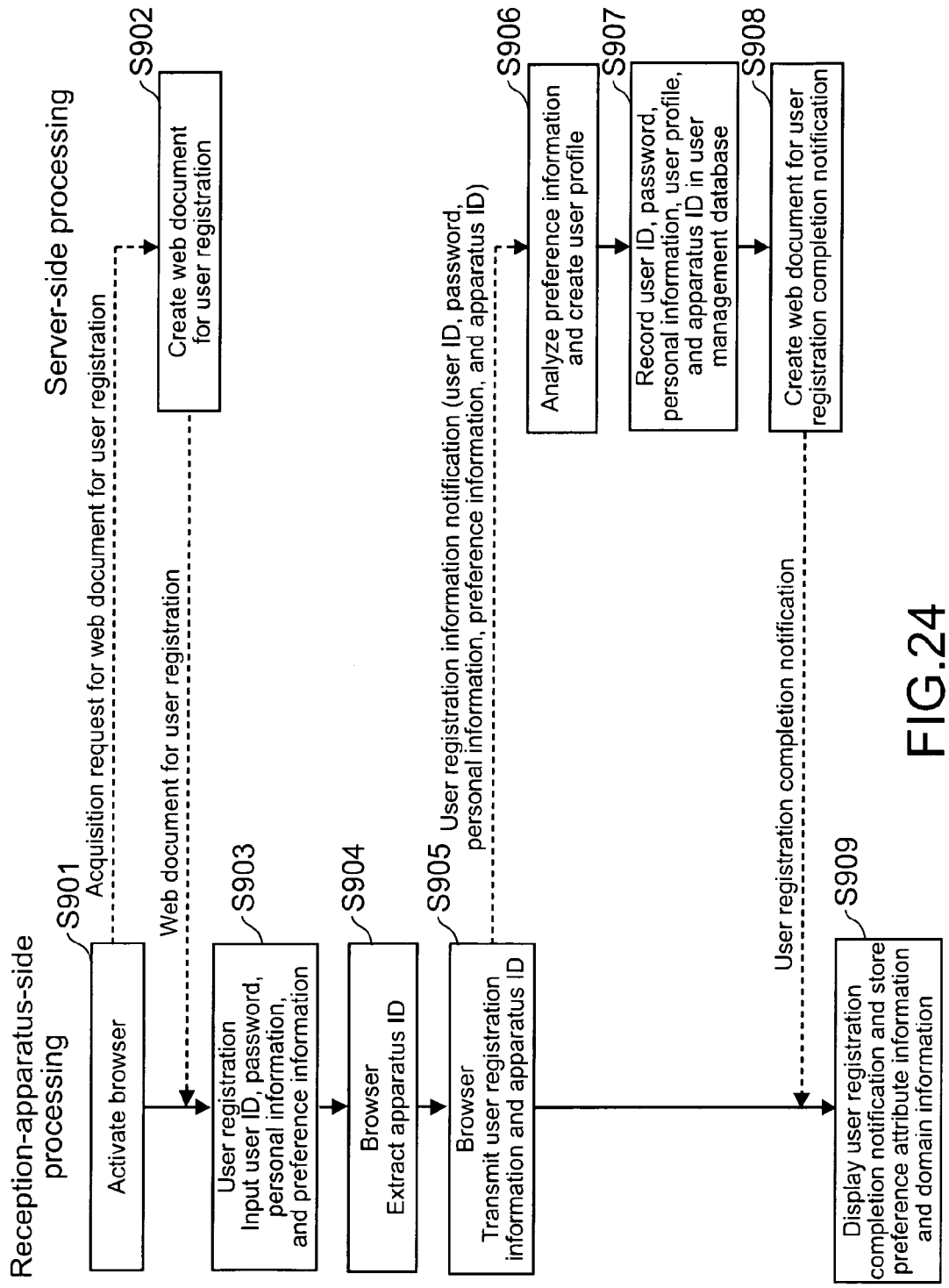
FIG. 24 is a sequence diagram showing a flow of processing at a time of a user registration to a portal server according to Modified Example 4.

FIG. 24 is a sequence diagram showing a flow of processing at a time of a user registration to the portal server 11 according to Modified Example 4.

First, the browser 21 of the reception apparatus 20 is activated. The browser 21 transmits an acquisition request for a web document for a user registration necessary for using the service provided by the portal server 11 to the portal server 11 (Step S901). The portal server 11 creates the web document for a user registration in response to the request and transmits it to the browser 21 of the reception apparatus 20 (Step S902).

The browser 21 of the reception apparatus 20 outputs the received web document for a user registration to the output section 71 via the input/output interface section 23. In the web document for a user registration, a plurality of information input columns for the user to input a user ID, a password, personal information, preference information, and the like are provided. When various types of information are input to those input columns by the user using the input section 72 (Step S903) and a registration button provided in the web document for a user registration is operated, the browser 21 extracts an apparatus ID allocated in advance to the reception apparatus 20 from the storage 25 of the reception apparatus 20 (Step S904). Then, the browser 21 transmits a user registration information notification including the information input to the input columns and the apparatus ID extracted from the storage 25 to the portal server 11 (Step S905).

Upon receiving the user registration information notification, the portal server 11 creates a user profile by analyzing the preference information included in the user registration information notification (Step S906). Next, the portal server 11 extracts the user ID, the password, the personal information, and the apparatus ID from the user registration information notification and records them in the user management database together with the created user profile as a set of user registration information while associating them with one another (Step S907).

After that, the portal server 11 creates a web document for a user registration completion notification and transmits it to the browser 21 of the reception apparatus 20 (Step S908). The browser 21 of the reception apparatus 20 displays the web document for a user registration completion notification and notifies the user of a user registration completion (Step S909).

Next, operations up to a reception and a reproduction of a CM-coupled stream in the reception apparatus 20 after the user registration according to Modified Example 4 will be described.

Figure 25:
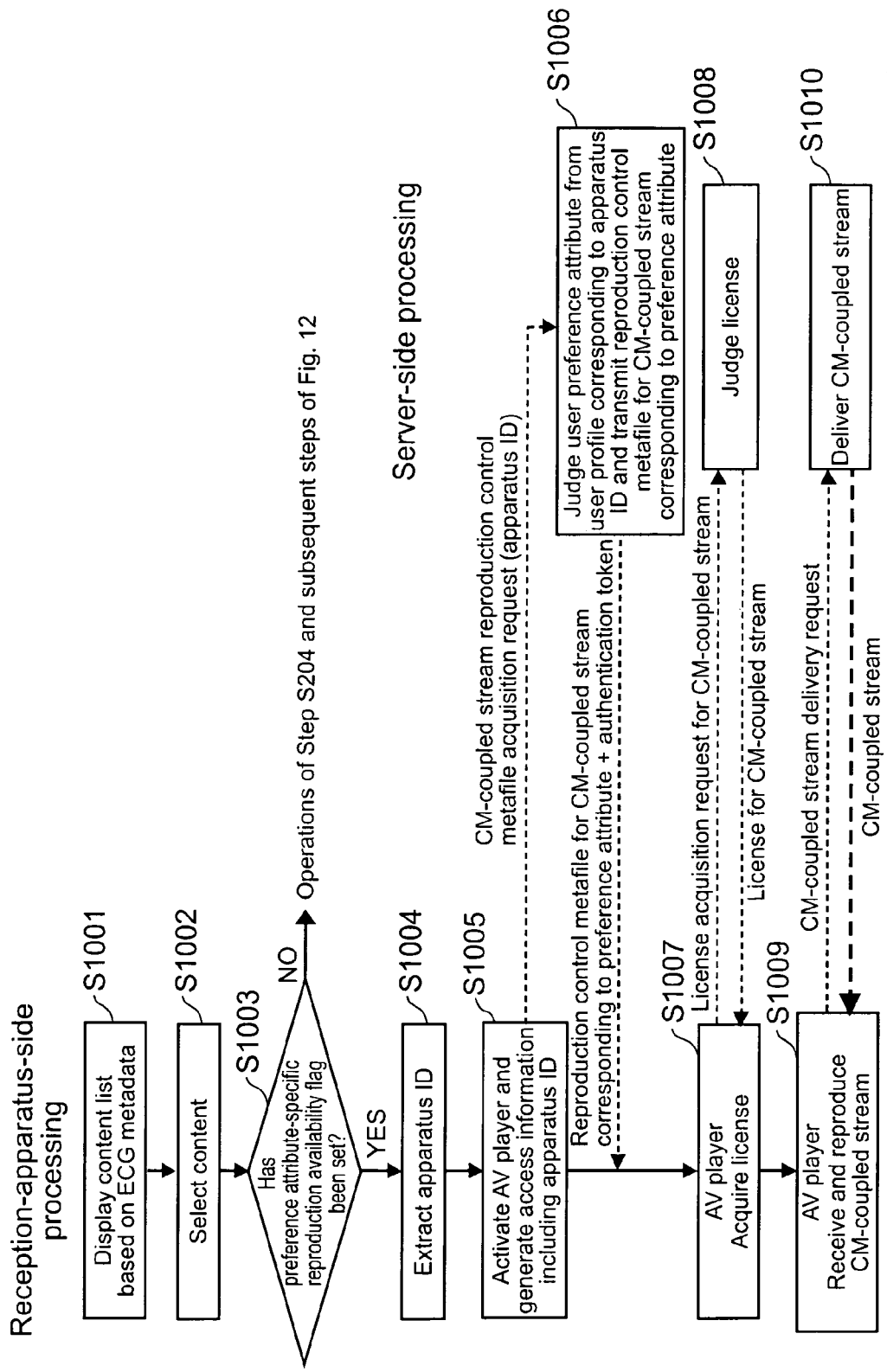
FIG. 25 is a sequence diagram showing processes from a selection of a CM-attached content to a reproduction of a CM-coupled stream in the reception apparatus after the user registration according to Modified Example 4.

FIG. 25 is a sequence diagram showing processes from a selection of a CM-attached content to a reproduction of a CM-coupled stream in the reception apparatus 20 after the user registration according to Modified Example 4.

First, operations of Steps S1001 to S1003 are the same as the operations of Steps S801 to S803 of FIG. 23 according to Modified Example 4.

The ECG processing section 24 of the reception apparatus 20 carries out the following processing when judging in Step S1003 that a preference attribute-specific reproduction availability flag in ECG metadata of a CM-attached content instructed to be reproduced by the user of the reception apparatus 20 is set. First, the ECG processing section 24 extracts an apparatus ID from the storage 25 of the reception apparatus 20 (Step S1004). The ECG processing section 24 then outputs an activation request including the apparatus ID and a CM-coupled stream reproduction control metafile URL in the ECG metadata to the AV player 22. The AV player 22 is activated in response to the activation request from the ECG processing section 24 and generates access information in which the apparatus ID included in the activation request is set as a query of the CM-coupled stream reproduction control metafile URL included in the same activation request. Then, the AV player 22 transmits a reproduction control metafile acquisition request for the CM-coupled stream including the access information to the reproduction control meta-server 13 (Step S1005).

The reproduction control meta-server 13 shares the user management database with the portal server 11. As a specific method for the reproduction control meta-server 13 and the portal server 11 to share the user management database, there is, for example, a method of operating the reproduction control meta-server 13 and the portal server 11 with a physically-single server apparatus and providing a user management database accessible by both servers in a storage apparatus connected to the server apparatus. Moreover, in the case of a user management database accessible only by the portal server 11, the reproduction control meta-server 13 may make an inquiry to the portal server 11 of a content of the user management database.

The reproduction control meta-server 13 judges whether the apparatus ID set as the query of the reproduction control metafile URL in the access information included in the reproduction control metafile acquisition request received from the reception apparatus 20 is registered in the user management database. When the apparatus ID is not registered in the user management database, the reproduction control meta-server 13 regards the reproduction control metafile acquisition request as a request from an unregistered user and transmits only a notification notifying to that effect to the reception apparatus 20 and not the reproduction control metafile.

When the apparatus ID is registered in the user management database, the reproduction control meta-server 13 regards the reproduction control metafile acquisition request as a request from a registered user. The reproduction control meta-server 13 then judges a preference attribute of the user based on the user profile registered in the user management database in association with the apparatus ID. In the storage section of the reproduction control meta-server 13, a CM-coupled stream reproduction control metafile is stored in association with each preference attribute. After judging the preference attribute of the user, the reproduction control meta-server 13 extracts a CM-coupled stream reproduction control metafile associated with the judged preference attribute from the storage section and transmits it to the reception apparatus 20 as a reproduction control metafile acquisition response together with an authentication token that is information that proves that the user registration has been completed (Step S1006).

After that, a delivery and a reproduction of the CM-coupled stream are performed by the same procedure as in Step S205 and subsequent steps of FIG. 12 (Steps S1007 to S1010).

Operations of the reception apparatus 20 at a time of receiving and reproducing a main-program stream are the same as those of the second embodiment.

As described above, according to Modified Example 4, a user who has completed a user registration can receive a delivery of a CM-coupled stream that satisfies a user preference by merely selecting a content that the user wishes to view in the reception apparatus 20 after the user registration.

It should be noted that the present invention is not limited to a video content and is also applicable to a download service of various contents such as music and a computer program.

The series of processes carried out by the server apparatus 10 and the reception apparatus 20 described above can be executed either by hardware or software. When executing the series of processes using software, software is installed from a program recording medium in a computer in which a program constituting the software is incorporated into dedicated hardware, a computer capable of executing various functions by installing various programs, such as a general-purpose personal computer, and the like.

Figure 26:
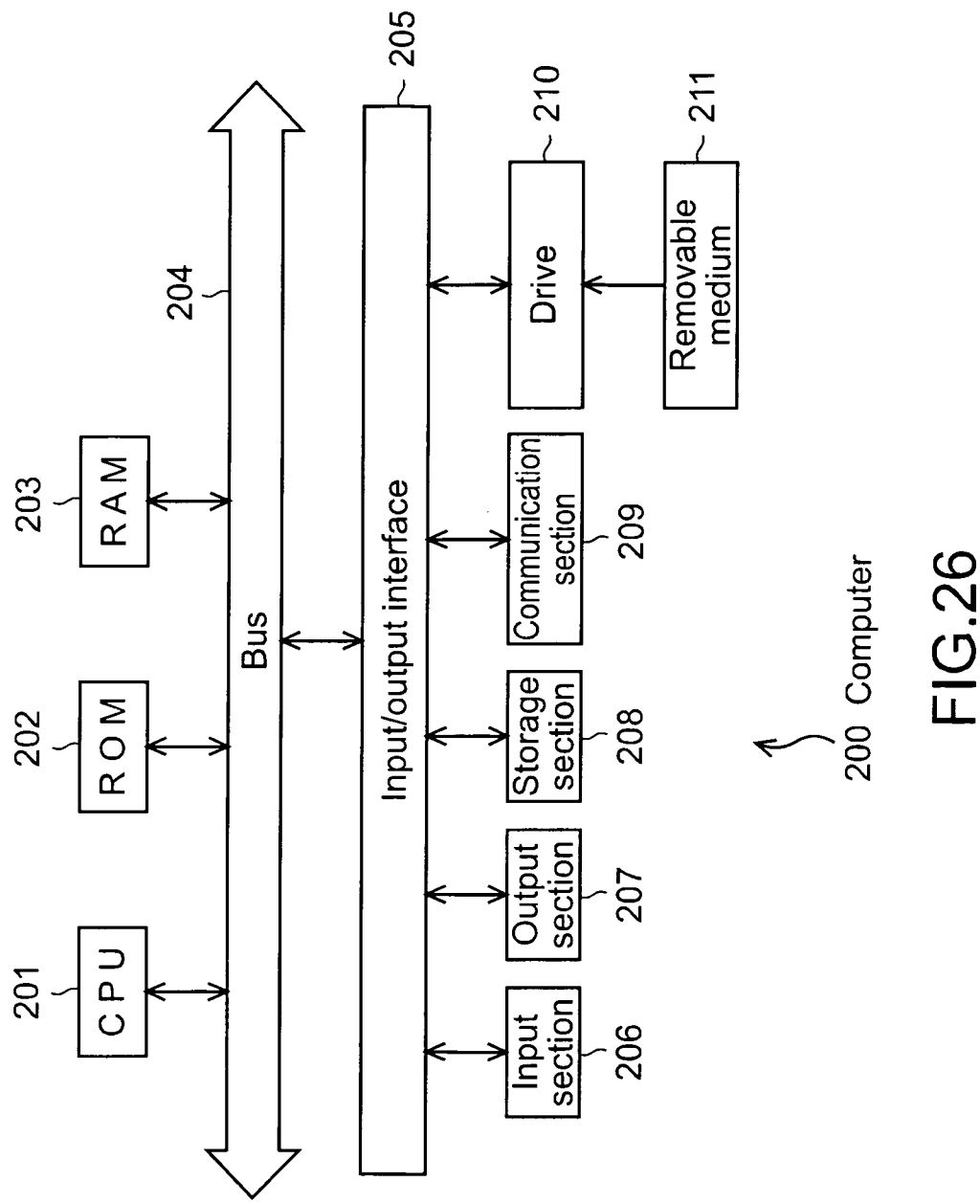
FIG. 26 is a block diagram showing an example of a hardware structure of a computer.

FIG. 26 is a block diagram showing an example of a hardware structure of a computer that executes the series of processes described above by a program.

In a computer 200, a CPU (Central Processing Unit) 201, a ROM (Read Only Memory) 202, and a RAM (Random Access Memory) 203 are mutually connected to one another by a bus 204.

Also connected to the bus 204 is an input/output interface 205. To the input/output interface 205, an input section 206 constituted of a keyboard, a mouse, a microphone, and the like, an output section 207 constituted of a display, a speaker, and the like, a storage section 208 constituted of a hard disk, a nonvolatile memory, and the like, a communication section 209 constituted of a network interface, and a drive 210 that drives a removable medium 211 such as a magnetic disk, an optical disc, a magneto optical disc, and a semiconductor memory are connected.

In the computer 200 having such a structure, the CPU 201 carries out the series of processes described above by loading a program stored in the storage section 208 to the RAM 203 via the input/output interface 205 and the bus 204 and executing the program.

It should be noted that the program executed by the computer 200 may be a program in which the processes are carried out in time series in the order described in the specification, or may be a program in which the processes are carried out in parallel or at necessary timings such as a call timing.

Further, the program may be processed by a single computer or may be processed dispersively by a plurality of computers. Furthermore, the program may be transferred to and executed in a remote computer.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus used in a system that delivers, to a reception apparatus via a network, a commercial stream of a content prior to a delivery of a main-program stream of the content, the server apparatus comprising:
    a processor to perform functions
    to store reproduction control information for the commercial stream, that includes at least first setting information that sets whether to restrict a trick reproduction in the reception apparatus; and
    to extract, in response to a first reproduction control information acquisition request from the reception apparatus, the reproduction control information for the commercial stream and transmit the reproduction control information for the commercial stream to the reception apparatus,
    wherein the reproduction control information for the commercial stream is stored in a reproduction control metafile comprising a content identification, a content title, a content uniform resource locator (URL), a digital rights management server URL, a license identification, and a trick reproduction inhibition flag, and wherein the reproduction control metafile is stored apart from any main-program stream reproduction control information
    the processor further performing functions
    to receive, from the reception apparatus, a reproduction end notification including at least first identification information that identifies the content interrupted while being reproduced in the reception apparatus, second identification information that identifies one of the reception apparatus and a user, and end time position information of one of the commercial stream and the main program stream interrupted while being reproduced;
    to store, as resume information, the first identification information, the second identification information, and the end time position information included in the received reproduction end notification in association with each other; and
    to transmit to the reception apparatus, as reproduction resumption position information, the end time position information of one of the commercial stream and the main program stream of the content based on the resume information in response to a content viewing request from the reception apparatus, that includes the first identification information that identifies the content interrupted while being reproduced and the second identification information that identifies one of the reception apparatus and the user.

2. The server apparatus according to claim 1,
    wherein the commercial stream is a commercial-coupled stream structured by coupling a plurality of pieces of commercial data into one stream.

3. The server apparatus according to claim 1, further comprising
    a viewed-information recording section to transmit, when the commercial stream is assumed to have been reproduced to the end based on the reproduction end notification of the commercial stream, delivery activation information for the main-program stream to the reception apparatus, and record commercial-viewed information that includes the first identification information and the second identification information included in the reproduction end notification.

4. The server apparatus according to claim 1, further comprising:
  a user preference storage section to store information on a preference of a user of the reception apparatus; and
  a delivery activation information transmission section to select the commercial stream satisfying the preference of the user by referencing the information on the preference of the user in the user preference storage section in response to a content-viewing request from the reception apparatus, and transmit, to the reception apparatus, delivery activation information including necessary information for acquiring the reproduction control information of the commercial stream in the reception apparatus.

5. A reception apparatus receiving, via a network, a commercial stream of a content prior to a delivery of a main-program stream of the content from the server apparatus according to claim 4 and reproducing the commercial stream, the reception apparatus comprising:
  a user preference information provision section to provide the information on the preference of the user to the server apparatus; and
  a delivery activation information acquisition section to transmit the content-viewing request to the server apparatus and acquire the delivery activation information including necessary information for acquiring the reproduction control information of the commercial stream satisfying the preference of the user from the server apparatus.

6. The server apparatus according to claim 1,
  wherein the reproduction control information transmission section selects, in response to a second reproduction control information acquisition request including information on a preference of a user from the reception apparatus, the commercial stream satisfying the preference of the user, and transmits the reproduction control information of the commercial stream to the reception apparatus.

7. A reception apparatus receiving, via a network, a commercial stream of a content prior to a delivery of a main-program stream of the content from the server apparatus according to claim 6 and reproducing the commercial stream, the reception apparatus comprising
  a second reproduction control information acquisition section to transmit the second reproduction control information acquisition request including the information on the preference of the user to the server apparatus and acquire the reproduction control information of the commercial stream satisfying the preference of the user from the server apparatus.

8. A reception apparatus receiving, via a network, a commercial stream of a content prior to a delivery of a main-program stream of the content from the server apparatus according to claim 1 and reproducing the commercial stream, the reception apparatus comprising:
  a first reproduction control information acquisition section to acquire the reproduction control information including the first setting information from the server apparatus; and
  a stream reproduction section to acquire and reproduce the commercial stream based on the acquired reproduction control information and determine, based on the first setting information included in the reproduction control information, whether to permit the trick reproduction of the commercial stream.

9. A reception apparatus receiving, via a network, a commercial stream of a content prior to a delivery of a main-program stream of the content from the server apparatus according to claim 1 and reproducing the commercial stream, the reception apparatus comprising:
  a reproduction end notification transmission section to transmit, to the server apparatus, the reproduction end notification including at least the first identification information that identifies the content interrupted while being reproduced, the second identification information that identifies one of the reception apparatus and the user, and the end time position information of one of the commercial stream and the main-program stream interrupted while being reproduced;
  a content-viewing request section to transmit to the server apparatus, when an instruction to view the content that has been interrupted while being reproduced is input by the user, the content-viewing request including the first identification information that identifies the content and the second identification information; and
  a stream delivery request section to acquire the reproduction resumption position information of one of the commercial stream and the main-program stream interrupted while being reproduced and request the server apparatus to deliver one of the commercial stream and the main-program stream from a time position at which the reproduction has been interrupted based on the reproduction resumption position information, the reproduction resumption position information being transmitted from the server apparatus in response to the content-viewing request.

10. A method of restricting a trick reproduction of a commercial stream of a content delivered from a server apparatus to a reception apparatus prior to a delivery of a main-program stream of the content, the method comprising:
  transmitting, from the server apparatus to the reception apparatus, reproduction control metadata necessary for controlling a reproduction of the commercial stream, the reproduction control metadata including first information that sets whether to restrict the trick reproduction; and
  acquiring and reproducing, by the reception apparatus, the commercial stream based on the reproduction control metadata and determining whether to permit the trick reproduction of the commercial stream based on the first information included in the reproduction control metadata,
  wherein the reproduction control information for the commercial stream is stored in a reproduction control metafile comprising a content identification, a content title, a content uniform resource locator (URL), a digital rights management server URL, a license identification, and a trick reproduction inhibition flag, and wherein the reproduction control metafile is stored apart from any main-program stream reproduction control information,
  the method further comprising
  receiving, from the reception apparatus, a reproduction end notification including at least first identification information that identifies the content interrupted while being reproduced in the reception apparatus, second identification information that identifies one of the reception apparatus and a user, and end time position information of one of the commercial stream and the main program stream interrupted while being reproduced;
  storing, as resume information, the first identification information, the second identification information, and the end time position information included in the received reproduction end notification in association with each other; and transmitting to the reception apparatus, as reproduction resumption position information, the end time position information of one of the commercial stream and the main program stream of the content based on the resume information in response to a content viewing request from the reception apparatus, that includes the first identification information that identifies the content interrupted while being reproduced and the second identification information that identifies one of the reception apparatus and the user.

* * * * *